United States Patent
Nakayama et al.

(10) Patent No.: US 12,050,457 B2
(45) Date of Patent: Jul. 30, 2024

(54) AUTOMATIC TEACHING SYSTEM

(71) Applicant: Taikisha Ltd., Tokyo (JP)

(72) Inventors: Genji Nakayama, Tokyo (JP); Yoshio Higashi, Tokyo (JP); Yoshikazu Hayashi, Tokyo (JP); Hiroyuki Suzuki, Tokyo (JP); Hideo Shiwa, Tokyo (JP)

(73) Assignee: Taikisha Ltd., Tokyo (JP)

( * ) Notice: Subject to any disclaimer, the term of this patent is extended or adjusted under 35 U.S.C. 154(b) by 644 days.

(21) Appl. No.: 17/268,254

(22) PCT Filed: Aug. 27, 2020

(86) PCT No.: PCT/JP2020/032317
§ 371 (c)(1),
(2) Date: Feb. 12, 2021

(87) PCT Pub. No.: WO2021/149295
PCT Pub. Date: Jul. 29, 2021

(65) Prior Publication Data
US 2022/0113711 A1    Apr. 14, 2022

(30) Foreign Application Priority Data

Jan. 24, 2020 (JP) ................................. 2020-009997

(51) Int. Cl.
*G05B 19/42* (2006.01)
*B25J 9/16* (2006.01)

(52) U.S. Cl.
CPC ........ *G05B 19/4207* (2013.01); *B25J 9/1661* (2013.01); *B25J 9/1697* (2013.01)

(58) Field of Classification Search
CPC ...... G05B 19/4207; G05B 2219/36248; G05B 2219/36282; G05B 2219/40425;
(Continued)

(56) References Cited

U.S. PATENT DOCUMENTS 5,851,248 A    12/1998  Wilson et al.
2002/0072297 A1*  6/2002  Kennerknecht ..... B24B 27/0038
                                                          451/5
(Continued)

FOREIGN PATENT DOCUMENTS

CN    109976259 A    7/2019
CN    110665707 A    1/2020
(Continued)

OTHER PUBLICATIONS

Pushcorp, Deburring | Engine Block | AFD & STC | End of Arm Robotic Tooling, YouTube, Nov. 16, 2017, retrieved from the Internet: https://www.youtube.com/watch?v=3Nx26nz1Z9Q.
(Continued)

*Primary Examiner* — Ziaul Karim
(74) *Attorney, Agent, or Firm* — The Webb Law Firm

(57) ABSTRACT

Provided is an automatic teaching system that is readily able to achieve automation, even when a small but varied number of processing objects are to undergo polishing or coating. The automatic teaching system includes a three-dimensional shape measurement apparatus, a reference marker, an image analysis apparatus, and a robot control device. The three-dimensional shape measurement apparatus acquires shape data of a processing target region on a processing object relative to the reference marker, and the image analysis apparatus divides the shape data of the processing target region into a plurality of continuous reference surfaces, in accordance with a predetermined algorithm, automatically generates a program of an operation path along which a polishing apparatus or coating apparatus of the robot is to be operated, for every reference surface, in accordance with a predetermined operation path generation rule, and transmits the program of the operation path to the robot control device.

12 Claims, 18 Drawing Sheets

(58) Field of Classification Search
CPC .......... G05B 2219/45096; B25J 9/1661; B25J 9/1697; B25J 9/16; B25J 9/1664; B25J 9/1679; B25J 11/0075; B25J 11/0065; B25J 9/0081; B25J 11/00; G01B 11/25; G01B 11/245; B24B 19/26; B24B 27/0038
See application file for complete search history.

(56) References Cited

U.S. PATENT DOCUMENTS

| | | | |
|---|---|---|---|
| 2010/0197213 | A1 | 8/2010 | Holzheimer et al. |
| 2011/0282492 | A1 | 11/2011 | Krause et al. |
| 2013/0307935 | A1* | 11/2013 | Rappel ................ H04N 13/279 348/46 |
| 2014/0114459 | A1* | 4/2014 | Nakahara ............... G05B 19/42 700/112 |
| 2014/0202332 | A1* | 7/2014 | Link ...................... B05B 14/43 55/436 |
| 2016/0271796 | A1* | 9/2016 | Babu ..................... B25J 9/1664 |
| 2016/0354933 | A1* | 12/2016 | Sato ....................... B25J 9/1633 |
| 2018/0243778 | A1 | 8/2018 | Covizzi et al. |
| 2018/0326591 | A1* | 11/2018 | Häusler ................. G01B 11/24 |
| 2020/0009705 | A1 | 1/2020 | Manabe et al. |
| 2021/0308826 | A1* | 10/2021 | Shiwa .................... G01N 21/84 |

FOREIGN PATENT DOCUMENTS

| | | |
|---|---|---|
| JP | H592345 A | 4/1993 |
| JP | H5289722 A | 11/1993 |
| JP | H6285762 A | 10/1994 |
| JP | H7185421 A | 7/1995 |
| JP | H9179619 A | 7/1997 |
| JP | H9244723 A | 9/1997 |
| JP | H1063324 A | 3/1998 |
| JP | 20054254 A | 1/2005 |
| JP | 200540682 A | 2/2005 |
| JP | 200765795 A1 | 3/2007 |
| JP | 2010188258 A | 9/2010 |
| JP | 2010276447 A | 12/2010 |
| JP | 2010536545 A | 12/2010 |
| JP | 2014527462 A | 10/2014 |
| JP | 2018531778 A | 11/2018 |
| WO | 2018235430 A1 | 12/2018 |

OTHER PUBLICATIONS

Pushcorp, Deburring I Engine Block & Pipe I AFD & STC I End of Arm Robotic Tooling, YouTube, Apr. 24, 2018, retrieved from the Internet: https://www.youtube.com/watch?v=8uzrGi4zILg.

XEBEC Technology English, EMO2019 XEBEC Brush_ Deburring and polishing, YouTube, Nov. 1, 2019, retrieved from the Internet: https://www.youtube.com/watch?v=vxsD019Svt0.

* cited by examiner

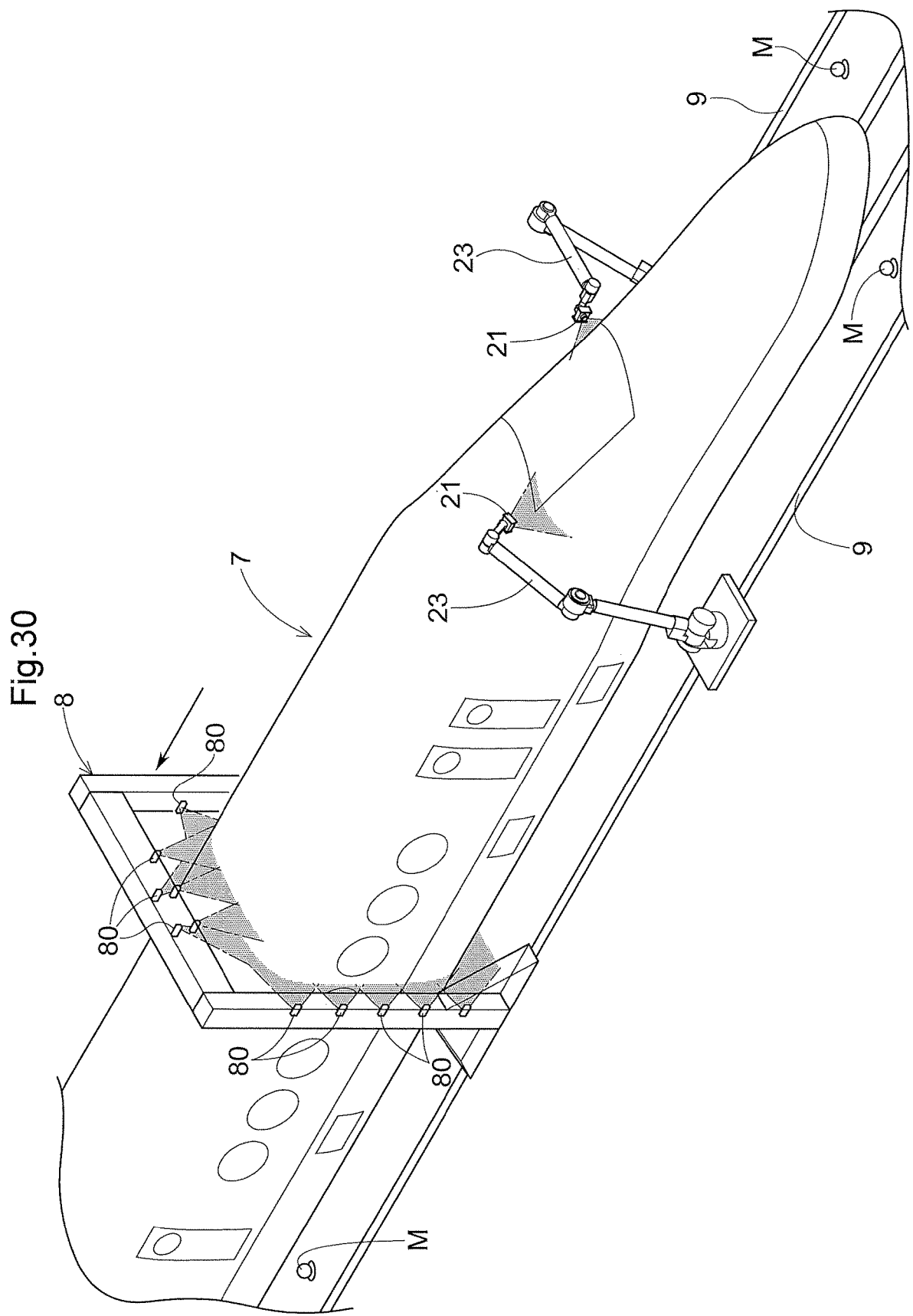

AUTOMATIC TEACHING SYSTEM

CROSS-REFERENCE TO RELATED APPLICATIONS

This application is the United States national phase of International Application No. PCT/JP2020/032317 filed Aug. 27, 2020, and claims priority to Japanese Patent Application No. 2020-009997 filed Jan. 24, 2020, the disclosures of which are hereby incorporated by reference in their entirety.

BACKGROUND OF THE INVENTION

Field of the Invention

The present invention relates to an automatic teaching system for teaching a robot that polishes or coats a processing object such as a product body of an automobile, two-wheeled vehicle, railway vehicle, airplane, marine vessel or similar transportation device, construction machinery, agricultural machinery, building/housing equipment, interior or exterior decorative material for buildings or lacquerware or a component thereof, for example, or a solid material such as metal, stone, ceramic, glass, resin, wood or composite material, for example.

Description of Related Art

With a conventional automatic polishing method, first, a polishing robot is taught beforehand the contents of operations to be performed on a polishing object, and then the shape of the polishing object is measured and the polishing robot is given a program of operations that follow the measured shape and caused to reproduce the operation program. Note that such an automatic polishing method is commonly and widely known, and thus prior art literature is not disclosed.

SUMMARY OF THE INVENTION

According to the conventional automatic polishing method, the polishing robot needs to be taught the operation contents beforehand, and the teaching needs to be carried out by a specialist technician. Accordingly, when the variety of polishing objects is extensive, teaching takes much time and effort, and introducing automation is difficult.

The present invention has been made in view of the above situation, and an object thereof is to provide an automatic teaching system that is readily able to achieve automation, even when a small but varied number of processing objects are to undergo polishing or coating.

In order to achieve this object, the present invention is directed to an automatic teaching system for teaching operation contents to a robot that polishes or coats a processing object, the system including:
  a three-dimensional shape measurement apparatus;
  a reference marker;
  an image analysis apparatus; and
  a robot control device,
  the three-dimensional shape measurement apparatus acquiring shape data of a processing target region on the processing object relative to the reference marker, and
  the image analysis apparatus dividing the shape data of the processing target region into a plurality of continuous reference surfaces, in accordance with a predetermined algorithm, automatically generating a program of an operation path along which a polishing apparatus or coating apparatus of the robot is to be operated, for every reference surface, in accordance with a predetermined operation path generation rule, and transmitting the program of the operation path to the robot control device.

According to this configuration, by combining a three-dimensional shape measurement apparatus and a reference marker, the shape data of the processing target region on the processing object is acquired at a position relative to the reference marker (reference coordinates), enabling more accurate shape data to be obtained. Further, by dividing the acquired shape data of the processing target region into a plurality of reference surfaces using an image analysis apparatus, characteristic portions are readily extracted due to analysis processing being implemented on every reference surface, and a program of the operation path along which the polishing apparatus or coating apparatus of the robot is to be smoothly operated can be efficiently generated automatically.

Accordingly, conventionally a specialist technician divides a shape drawn from three-dimensional shape data of a processing target region on the processing object into a plurality of reference surfaces while viewing a monitor, and teaches the robot the operation path along which the polishing apparatus or coating apparatus is to be operated by visually aligning the normals of the respective reference surfaces, whereas, with the present invention, it is possible to generate the operation path automatically, and thus teaching time is markedly shortened, and even a small but varied number of processing objects can be readily handled.

In the automatic teaching system according to the present invention, the image analysis apparatus may further automatically generate a program relating to an angle and position of the polishing apparatus or coating apparatus relative to the generated operation path, and transmit the program relating to the angle and position of the polishing apparatus or coating apparatus to the robot control device.

As with this configuration, polishing or coating work by a robot that polishes or coats can be implemented more reliably and accurately as a result of a program relating to the angle and position of the polishing apparatus or coating apparatus being automatically generated.

In the automatic teaching system according to the present invention, the predetermined algorithm may be an algorithm that divides the shape data of the processing target region of the processing object into a plurality of continuous reference surfaces, based on a curvature radius of the processing target region.

According to this configuration, the shape data is divided into a plurality of reference surfaces based on the curvature radius of the processing target region of the processing object, thus enabling an operation path with good processing efficiency to be generated for every reference surface.

In the automatic teaching system according to the present invention, the predetermined operation path generation rule may be a rule set based on a characteristic portion of the processing target region detected from the shape data by the image analysis apparatus.

According to this configuration, the predetermined operation path generation rule is set based on a characteristic portion of the processing target region, thus enabling an operation path with even better processing efficiency to be generated by means such as deviating from the operation path with regard to the characteristic portion.

In the automatic teaching system according to the present invention, the characteristic portion of the processing target region may be a recessed portion, raised portion or opening with respect to the reference surface.

According to this configuration, by taking the characteristic portion of the processing target region to be a recessed portion, raised portion or opening with respect to the reference surface, the characteristic portion is readily detected and the operation path can be generated more efficiently.

The automatic teaching system according to the present invention may include a pallet member for loading the processing object, the reference marker may be provided to the pallet member, and the shape data of the processing target region on the processing object relative to the reference marker may be acquired for the pallet member on which the processing object is loaded.

According to this configuration, the shape data of the processing target region can be acquired in a state where the processing object is loaded on a pallet member, and thus, even in the case of a small but varied number of processing objects, by placing each processing object on a pallet member, the processing objects can be processed continuously with an assembly line method that uses a belt conveyor or the like, for example, and the processing efficiency of polishing or coating is further enhanced.

BRIEF DESCRIPTION OF THE DRAWINGS

FIG. 30 is a diagram showing an example of a method for acquiring shape data of the entire body of a railway vehicle.

DETAILED DESCRIPTION OF THE INVENTION

Embodiments

Embodiments according to the present invention will be described based on the drawings. Note that the present embodiment describes an example in which an automatic teaching system according to the present invention is applied to an automatic polishing system provided with a polishing robot that polishes processing objects such as automobile bodies. Also, in the present embodiment, processing objects including automobile bodies and constituent components thereof (vehicle members) are referred to as "works".

Figure 1:
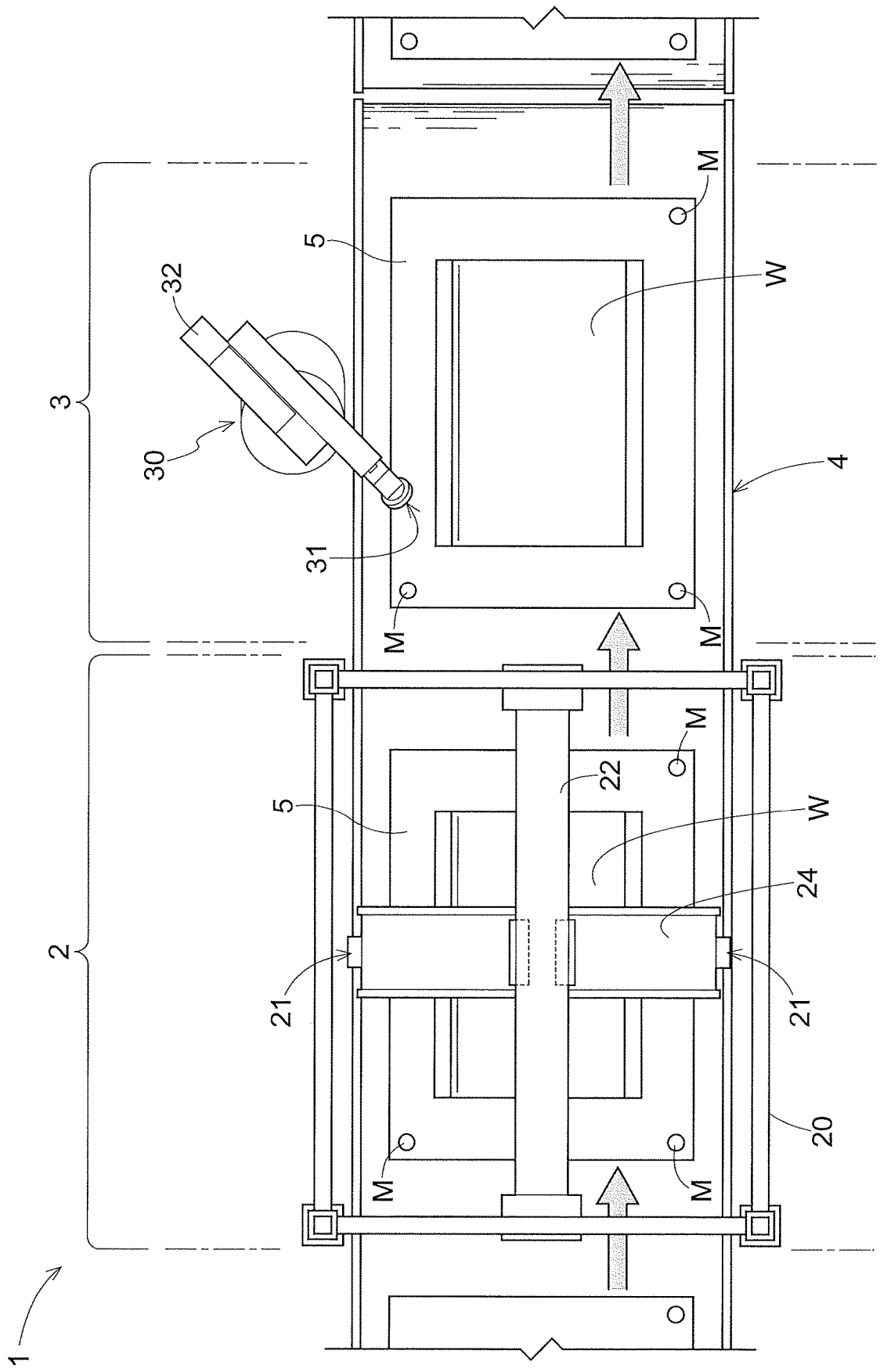
FIG. 1 is a schematic plan view of a system for automatically polishing a processing object placed on a pallet member.
Figure 2:
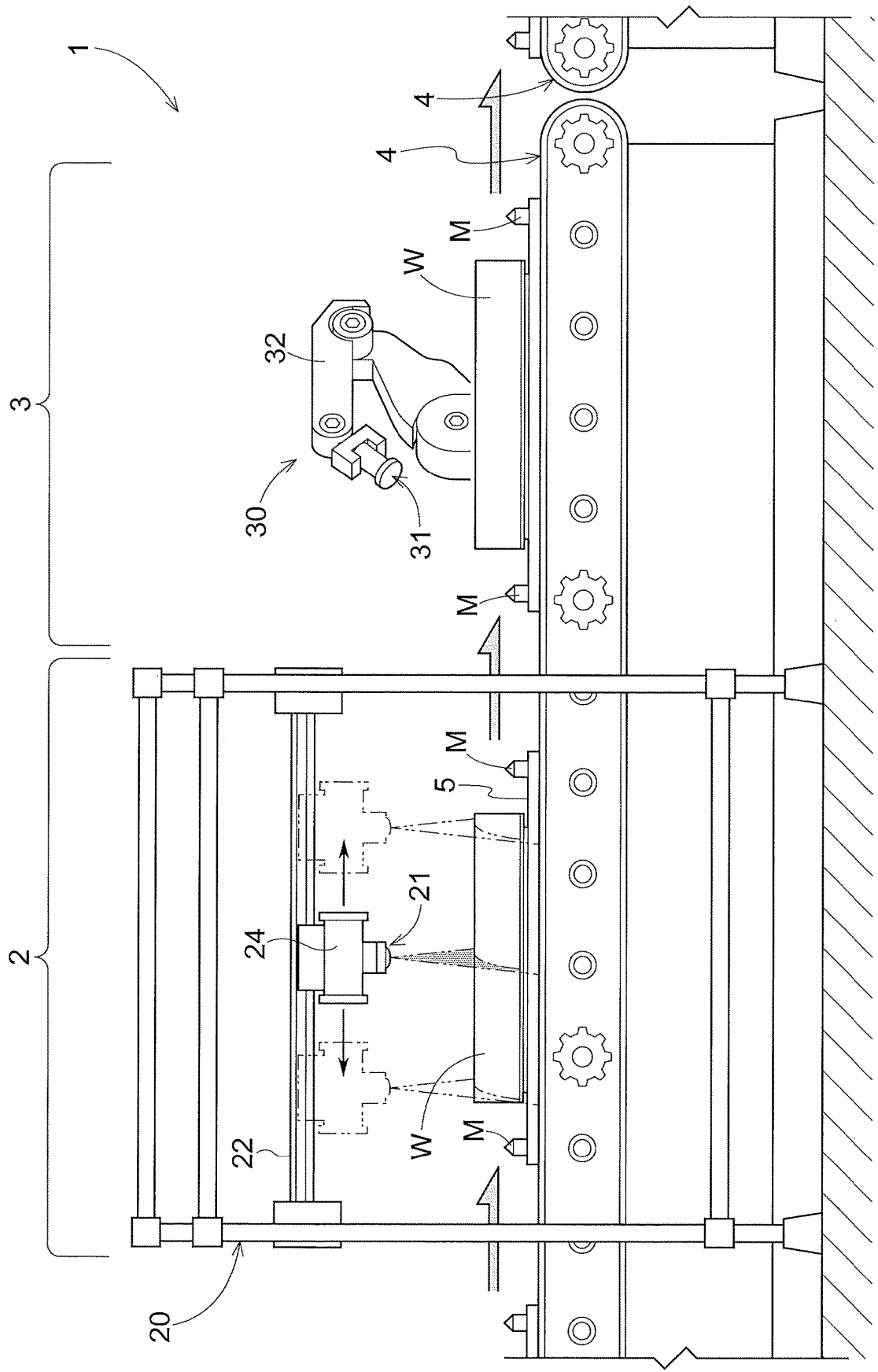
FIG. 2 is a schematic side view of the system for automatically polishing a processing object placed on a pallet member.

Automatic Polishing System:

As shown in FIGS. 1 and 2, an automatic polishing system 1 of the present embodiment is provided with a scanning area 2, a polishing area 3, a belt conveyor 4 (example of automatic conveying apparatus) for constituting assembly line work, pallet members 5 for loading works W, and a PC (example of image analysis apparatus) which is not illustrated. The scanning area 2 is adjacent to the polishing area 3, and the pallet members 5 on which works W are loaded are configured to be automatically conveyed from the scanning area 2 to the polishing area 3 by the belt conveyor 4.

Figure 3:
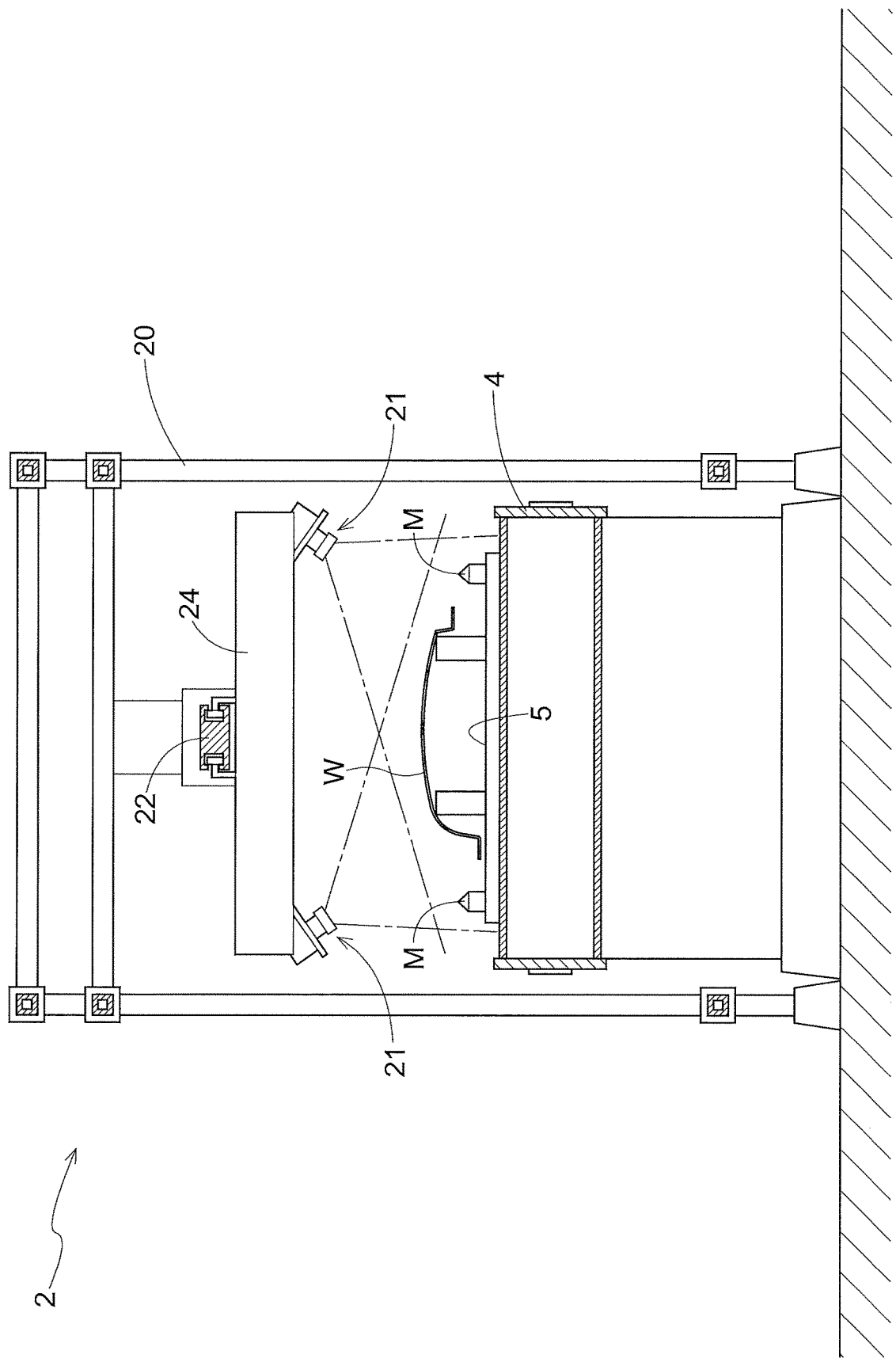
FIG. 3 is a schematic front view of a scanning area.

As shown in FIG. 3, the scanning area 2 is provided with a main body frame 20 assembled in a box-shape with a rod-shaped aluminum frame or the like, an optical cutting 3D laser scanner 21 (example of three-dimensional shape measurement apparatus), and a control device (not illustrated) that controls the operations of the 3D laser scanner 21.

Note that, in the present embodiment, non-contact optical cutting is illustrated as the scanning method of the three-dimensional shape measurement apparatus, but the present invention is not limited thereto. Triangulation, time-of-flight and phase difference are given as examples of other scanning methods applicable to the present invention.

In the present embodiment, two 3D laser scanners 21 are provided in an upper portion within the main body frame 20. The 3D laser scanners 21 are supported via a single-axis slider 22 that extends in the conveyance direction of the belt conveyor 4 and a support member 24 that is orthogonal to the extension direction of the single-axis slider 22. The single-axis slider 22 extends in the conveyance direction of the belt conveyor 4, and is configured such that the 3D laser scanners 21 move horizontally in the extension direction of the single-axis slider 22. Note that the 3D laser scanners 21 are provided one on either side of the support member 24.

Figure 4:
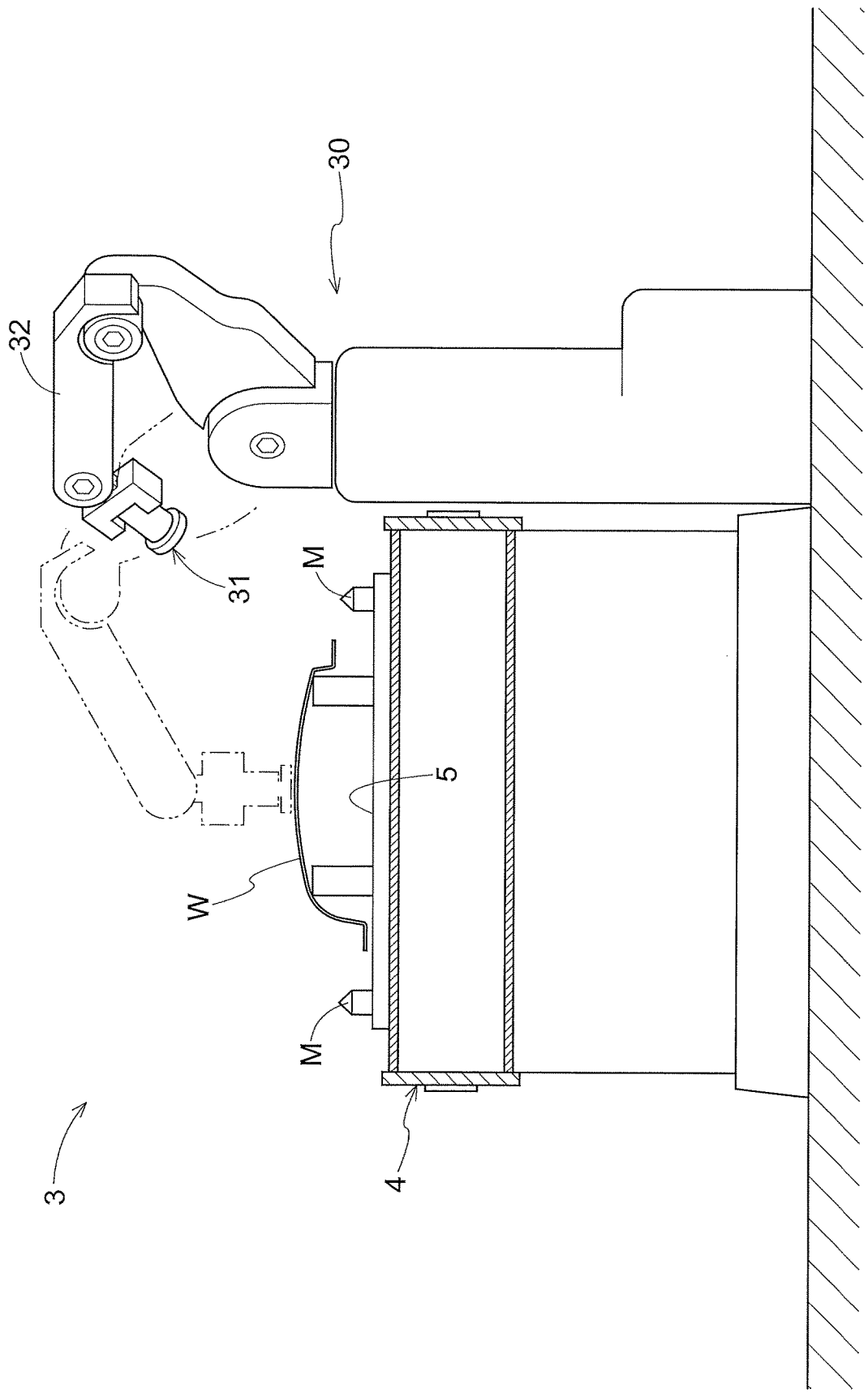
FIG. 4 is a schematic front view of polishing area.

As shown in FIG. 4, a polishing robot 30 is installed in the polishing area 3. The polishing robot 30 has a polishing apparatus 31 that polishes the work W, a multi-axis robot arm 32 that supports the polishing apparatus 31, and a robot control device (not illustrated) that controls the movement of the polishing apparatus 31 and the robot arm 32.

Figure 5:
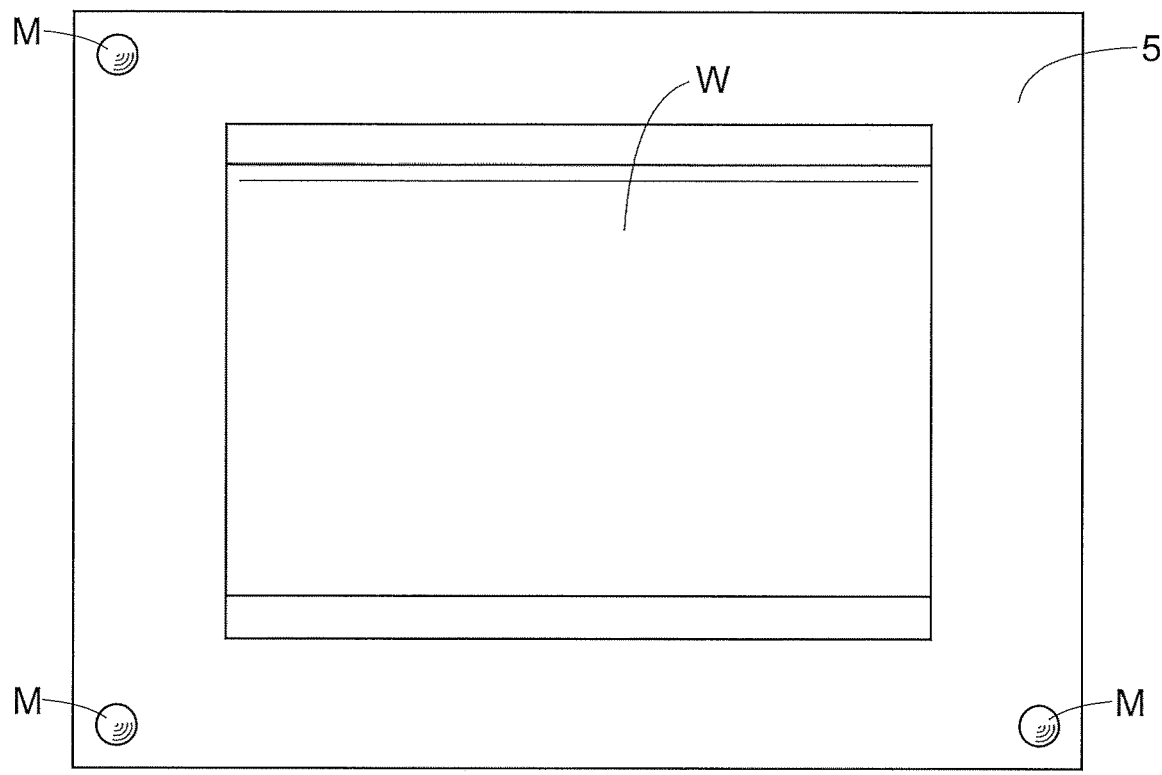
FIG. 5 is a schematic plan view of a pallet member for loading a processing object.
Figure 6:
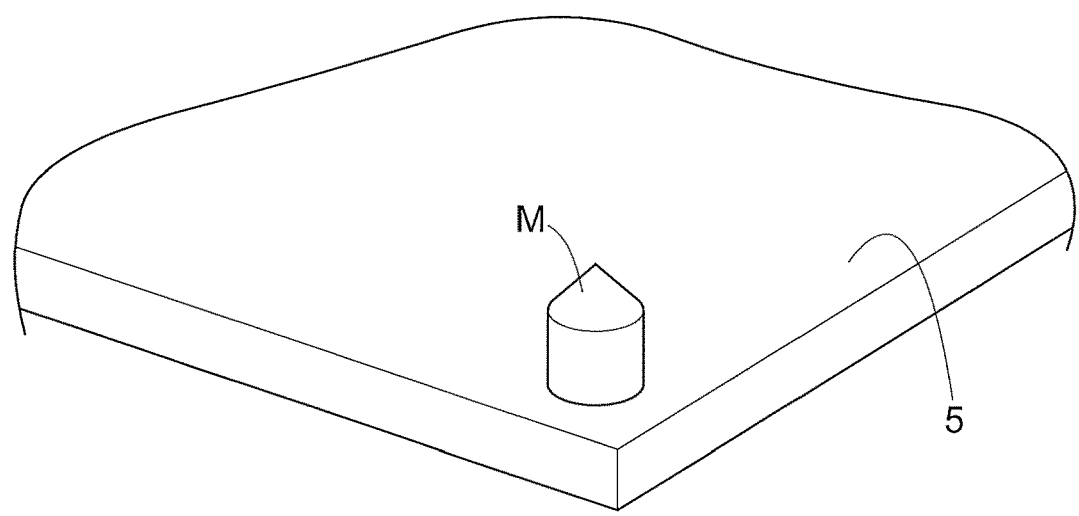
FIG. 6 is a perspective diagram of reference markers provided on the pallet member.

As shown in FIGS. 5 and 6, the pallet member 5 of the present embodiment has a flat rectangular shape, and a reference marker M is provided in three of the four corners thereof.

Figure 7:
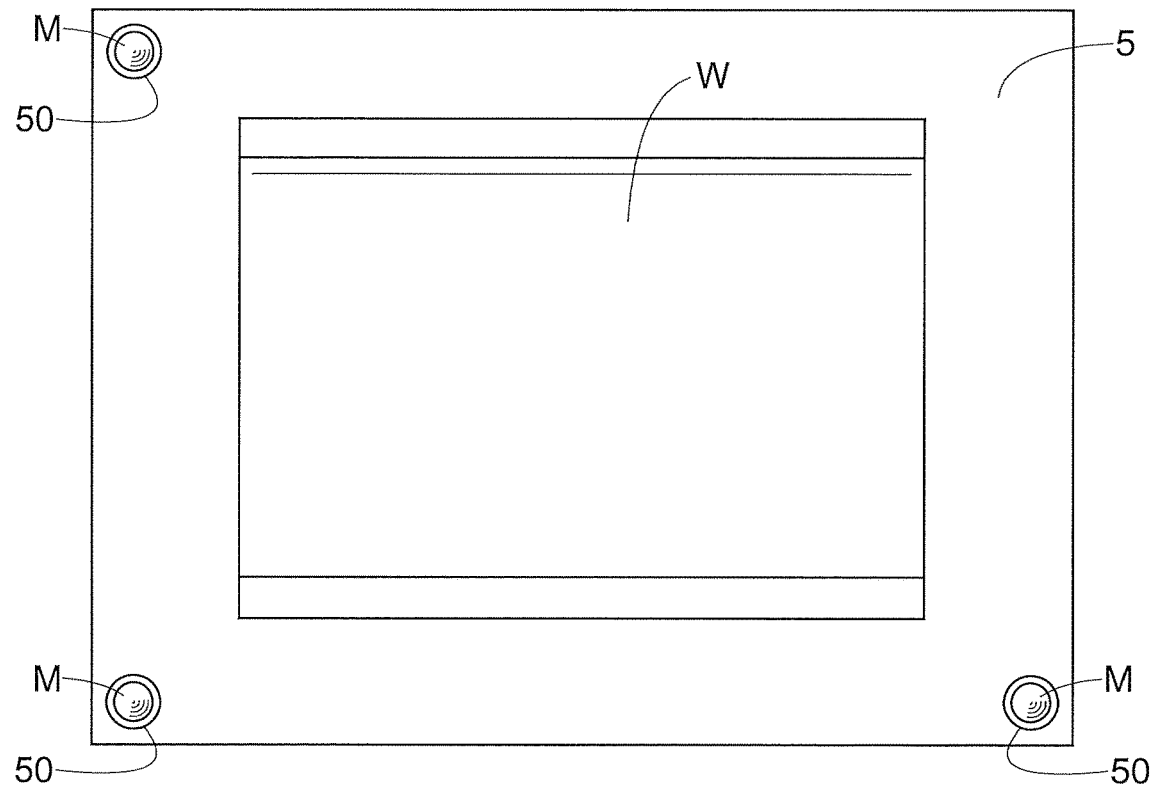
FIG. 7 is a schematic plan view of another mode of the pallet member for loading a processing object.
Figure 8:
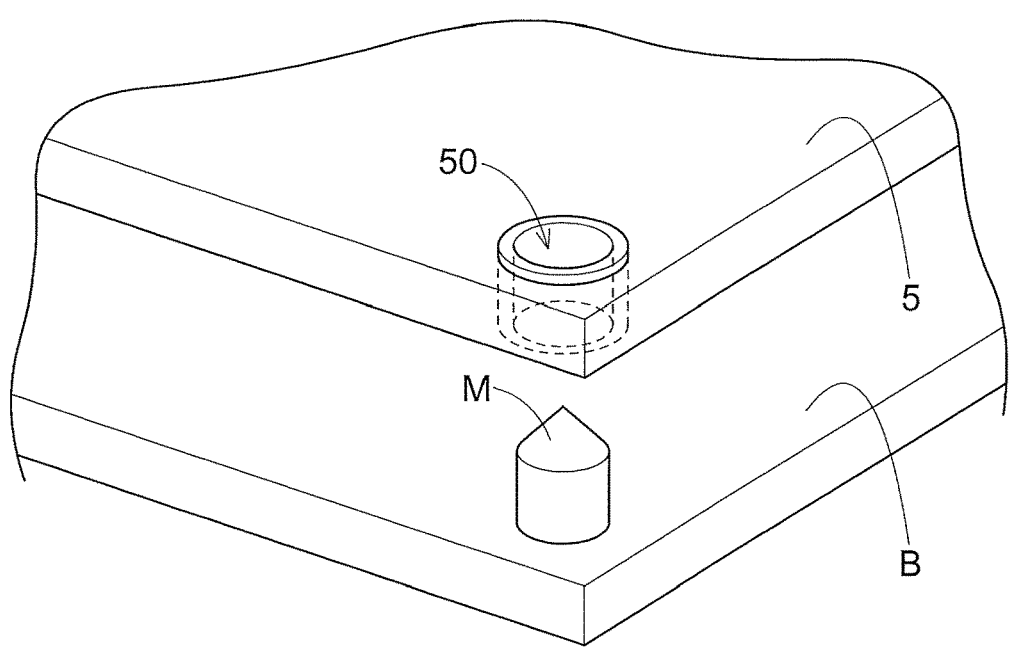
FIG. 8 is partially enlarged view of an exploded perspective view of the other mode of the pallet member.

Note that the configuration related to the reference markers M is not limited thereto, and as shown in FIGS. 7 and 8, for example, the reference markers M may be constituted separately to the pallet member 5. In other words, the reference markers M are provided at predetermined positions of a base member B, and when the pallet member 5 is placed on the base member B, the reference markers M are provided to the pallet member 5 at the same time as the pallet member 5 is positioned on the base member B, by the reference markers M of the base member B being inserted into through holes 50 provided in the pallet member 5. That is, the reference markers M of the base member B also function as positioning members of the pallet member 5.

The shape of the pallet member 5 is not limited to a flat rectangular shape, and the shape and size thereof can be freely changed as needed as long as the work W can be loaded at a predetermined position and the reference markers M can be provided. Also, the pallet member 5 is desirably constituted with a rubber material, in order to prevent shifting of the loaded work W.

Automatic Teaching System:

The automatic teaching system in the present embodiment is provided with the 3D laser scanners 21, the pallet members 5, the reference markers M, the PC, and the robot control device.

The 3D laser scanners 21, with regard to the pallet member 5 on which the work W is loaded, acquires shape data of a processing target region on the work W relative to the reference markers. The 3D laser scanners 21 acquire three-dimensional (X, Y, Z) point group data with a laser cutting method.

Figure 9:
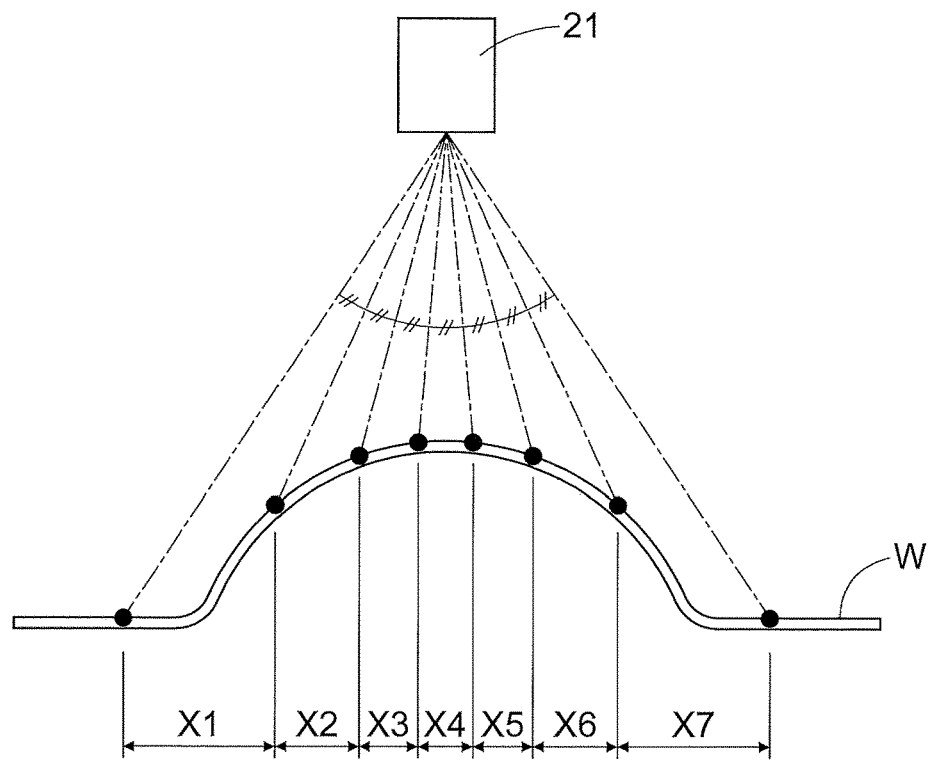
FIG. 9 is a diagram schematically showing a scanning method of a 3D scanner in which scanning lines are not regularly spaced in the X-axis direction.
Figure 10:
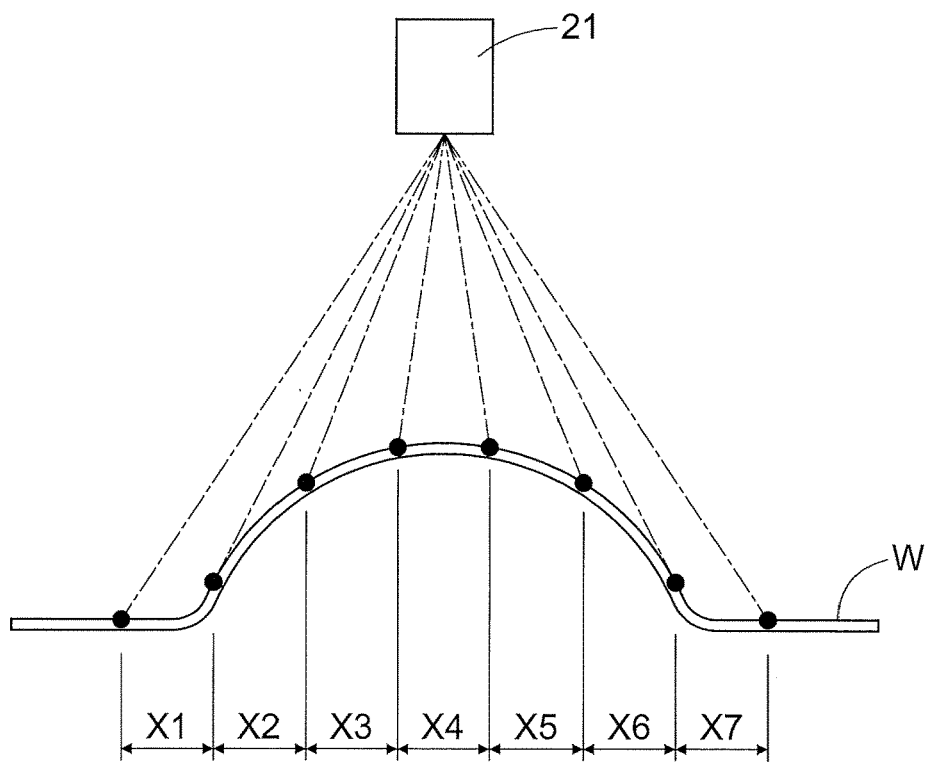
FIG. 10 is a diagram schematically showing a scanning method of a 3D scanner in which scanning lines are regularly spaced in the X-axis direction.

Shape data that is generally measured by the 3D laser scanners 21 is data in which the scan line intervals in the X-axis direction are not regular, as shown in FIG. 9, with the scan line interval in the X-axis direction decreasing as the distance between the scanner and the work W becomes shorter, and the scan line interval in the X-axis direction increasing as the distance between the scanner and the work W becomes longer ((X1, X7)>(X2, X6)>(X3, X4, X5)). Thus, measures are desirably adopted to substitute the shape data such that the scan line intervals in the X-axis direction are regular intervals, as shown in FIG. 10 (X1=X2=X3=X4=X5=X6=X7). This results in coordinates in which the X-axis and the Y-axis are orthogonal when the coordinates of the work W are viewed from directly above, and enables the data to be treated like an image, thus facilitating coordinate acquisition.

The PC divides the shape data acquired by the 3D laser scanners 21 into a plurality of continuous reference surfaces D, in accordance with a predetermined algorithm. An algorithm configured to divide the shape data into a plurality of continuous reference surfaces D based on a curvature radius R of the processing target region of the work W is given as an example of the predetermined algorithm.

Figure 11:
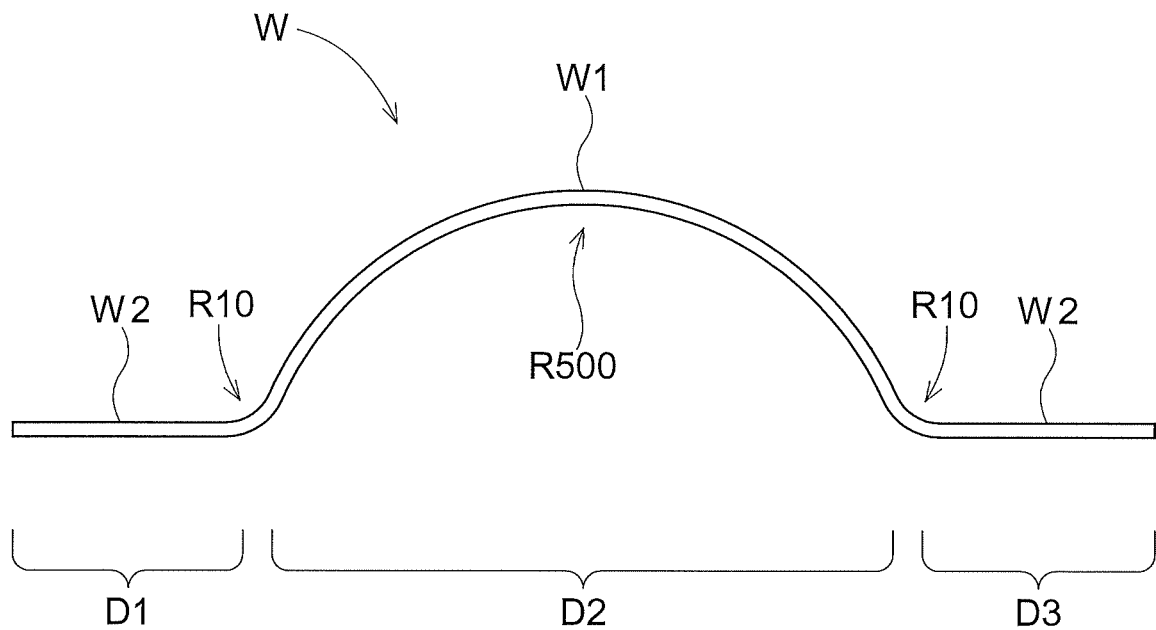
FIG. 11 is an illustrative diagram showing how shape data of a processing target region is divided into a plurality of reference surfaces.
Figure 12:
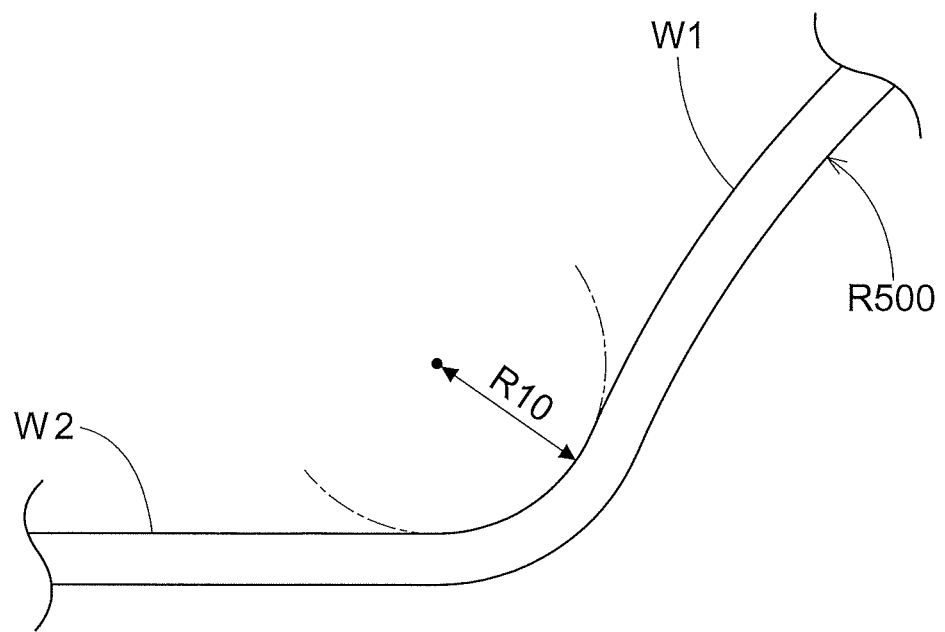
FIG. 12 is a partially enlarged view of FIG. 11.

For example, in the case where the work W has a shape in which a half-tube raised portion W1 is formed in a flat plate, as shown in FIGS. 11 and 12, the cross-sectional shape of the work W will have a straight portion W2 at both ends of the semicircular portion W1. Here, when an algorithm whose criterion is whether the curvature radius R is less than 20 is set, where the curvature radius R of the semicircular portion W1 is 500 and the curvature radius R of the connecting portion between the straight portion W2 and the semi-circle-like portion W1 is 10, the shape data of the work W will be divided into the three reference surfaces D1 to D3, as shown in FIG. 11.

Next, the PC acquires the coordinates of a characteristic portion such as a recessed portion, raised portion or opening, for each of the generated reference surfaces D.

Figure 13:
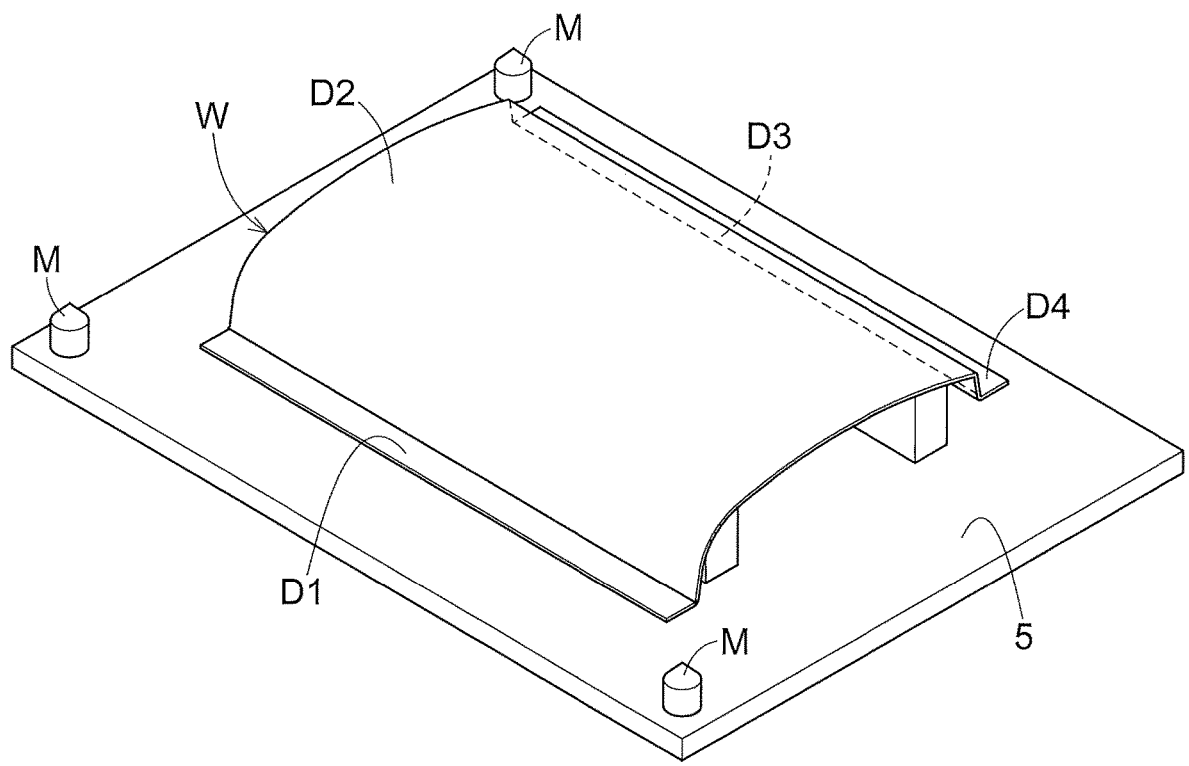
FIG. 13 is an external perspective view of a plain processing object placed on the pallet member.
Figure 14:
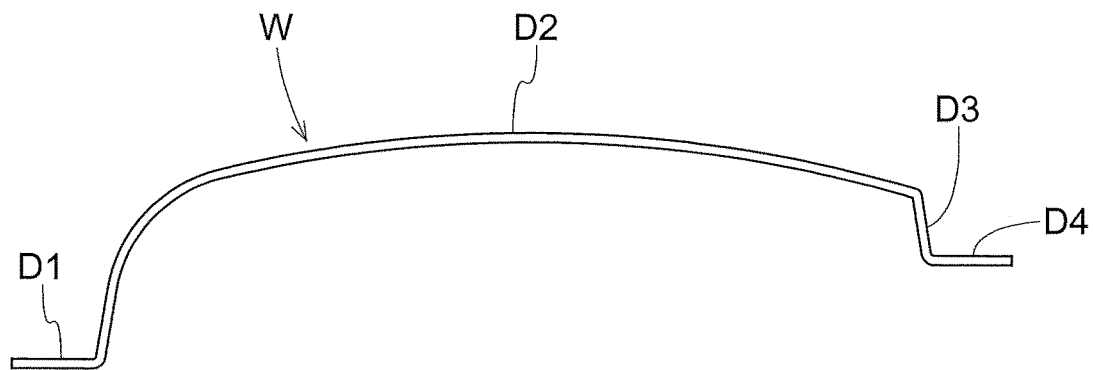
FIG. 14 is a longitudinal cross-sectional view of the plain processing object.

For example, in the case where the work W has a plain shape with two flange surfaces at both ends, as shown in FIG. 13, the PC only divides the shape data into the four reference surfaces D1 to D4 based on the curvature radius, as shown in FIG. 14, and does not extract a characteristic portion.

Figure 16:
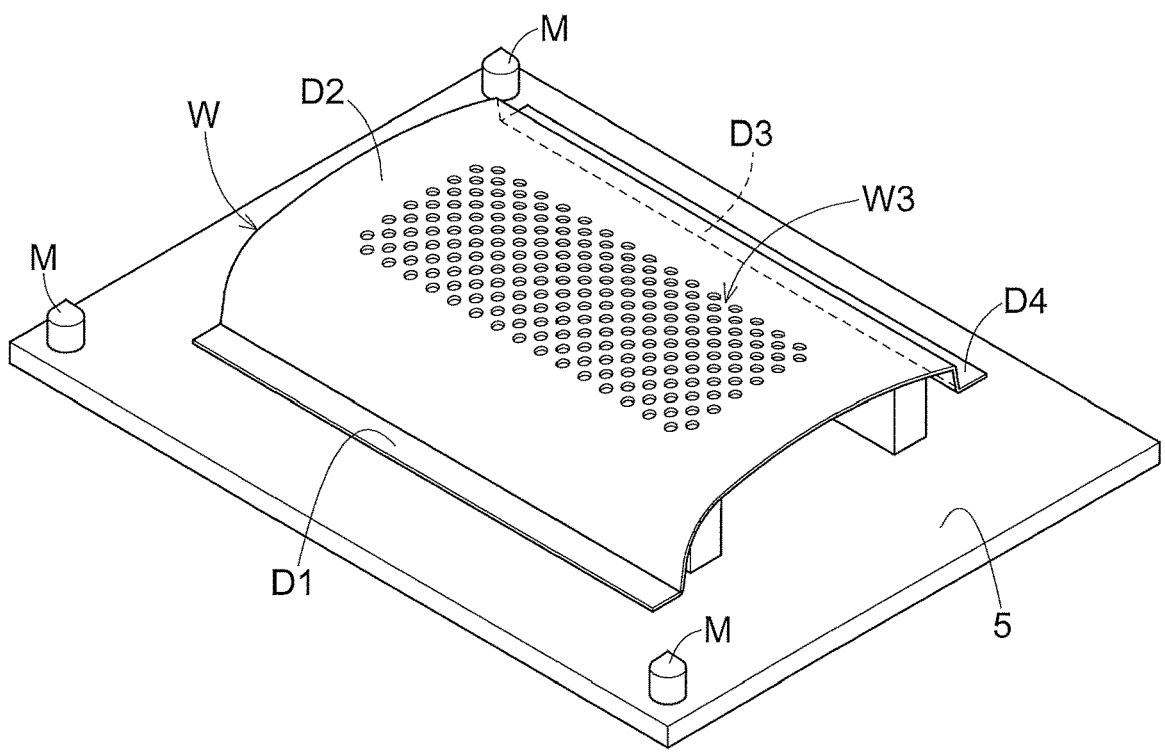
FIG. 16 is an external perspective view of a processing object with a multi-hole portion placed on a pallet member.
Figure 17:
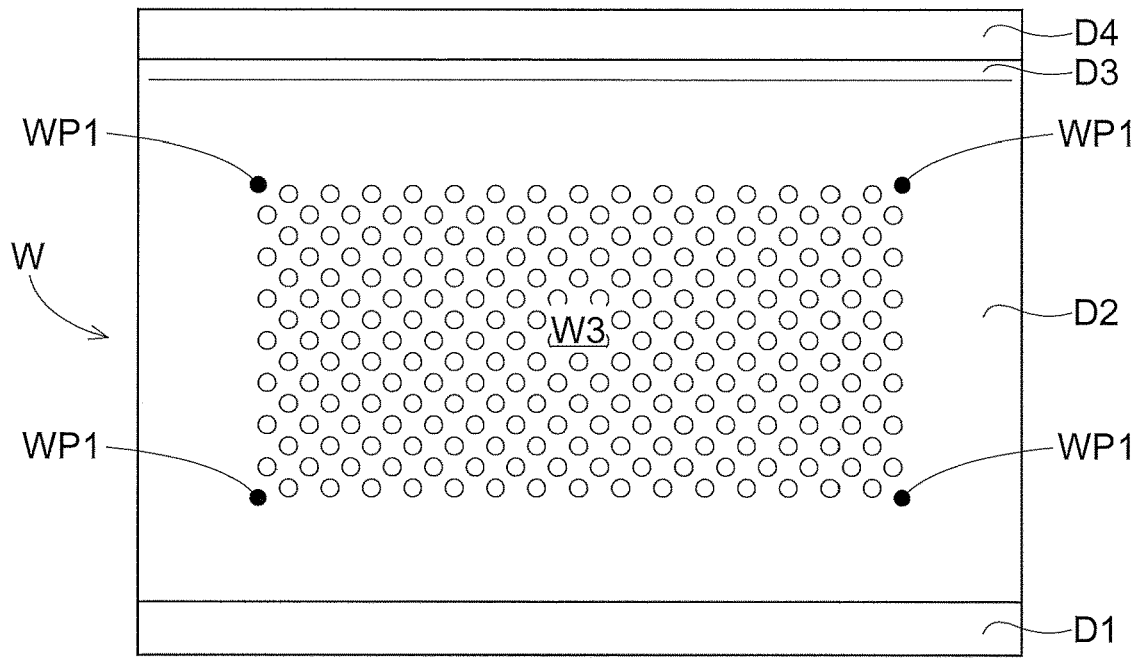
FIG. 17 is a plan view of the processing object with the multi-hole portion.

However, in the case where, as shown in FIGS. 16 and 17, for example, a multi-hole portion W3 (example of recessed portion) consisting of many small holes is formed as a characteristic portion in the reference surface D2 of the aforementioned work W shown in FIG. 13, the PC detects the small holes in the reference surface D2, specifies the distribution region thereof as the multi-hole portion W3, and sets the four corners of the multi-hole portion W3 as specific points (multi-hole portion coordinate specific points WP1).

With recessed portions in the present embodiment, a standard is provided for the depth thereof, and a recessed portion is determined to be a "depression" if within the standard depth, and is determined to be a "through hole" if the depth exceeds the standard. Note that a recessed portion having a depth less than the standard is determined to be "coplanar", and is not determined to be a "recessed portion". For example, in the case of a depth corresponding to the level difference between plate thicknesses of the work W, the recessed portion is determined to be "coplanar".

Figure 19:
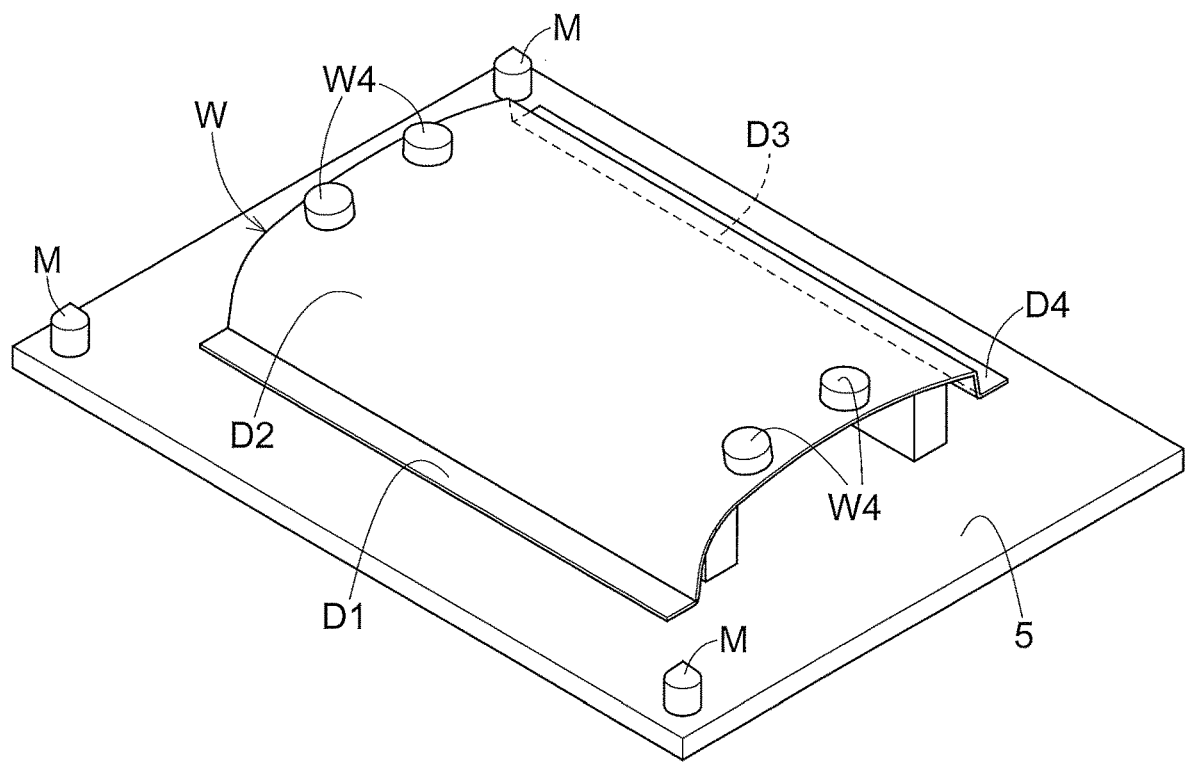
FIG. 19 is an external perspective view of a processing object with raised portions placed on a pallet member.
Figure 20:
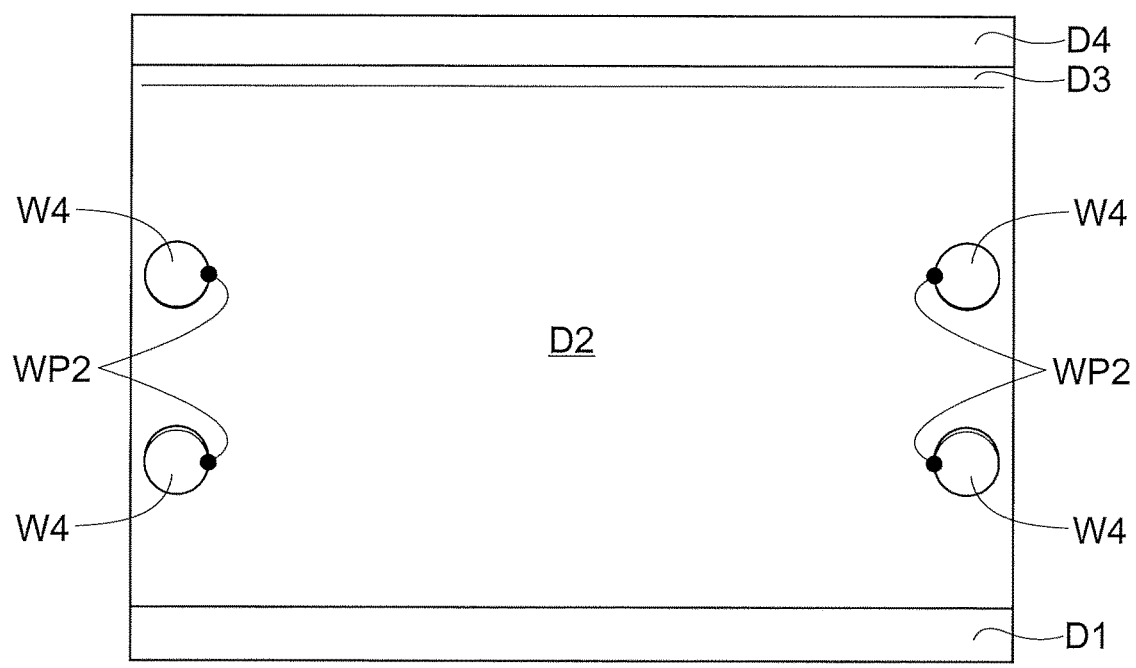
FIG. 20 is a plan view of the processing object with the raised portions.

Also, in the case where, as shown in FIGS. 19 and 20, for example, raised portions W4 serving as a characteristic portion are formed on the reference surface D2 of the aforementioned work W shown in FIG. 13, the PC detects the raised portions W4 on the reference surface D2, specifies the regions thereof, and sets specific points (raised portion coordinate specific points WP2) within the specified region.

With raised portions in the present embodiment, a standard is provided for the height thereof, and a raised portion is determined to be a "large raised portion" if within the standard height, and is determined to be a "projection" if the height exceeds the standard. Note that a raised portion having a height less than the standard is determined to be "coplanar", and is not determined to be a "raised portion".

Figure 23:
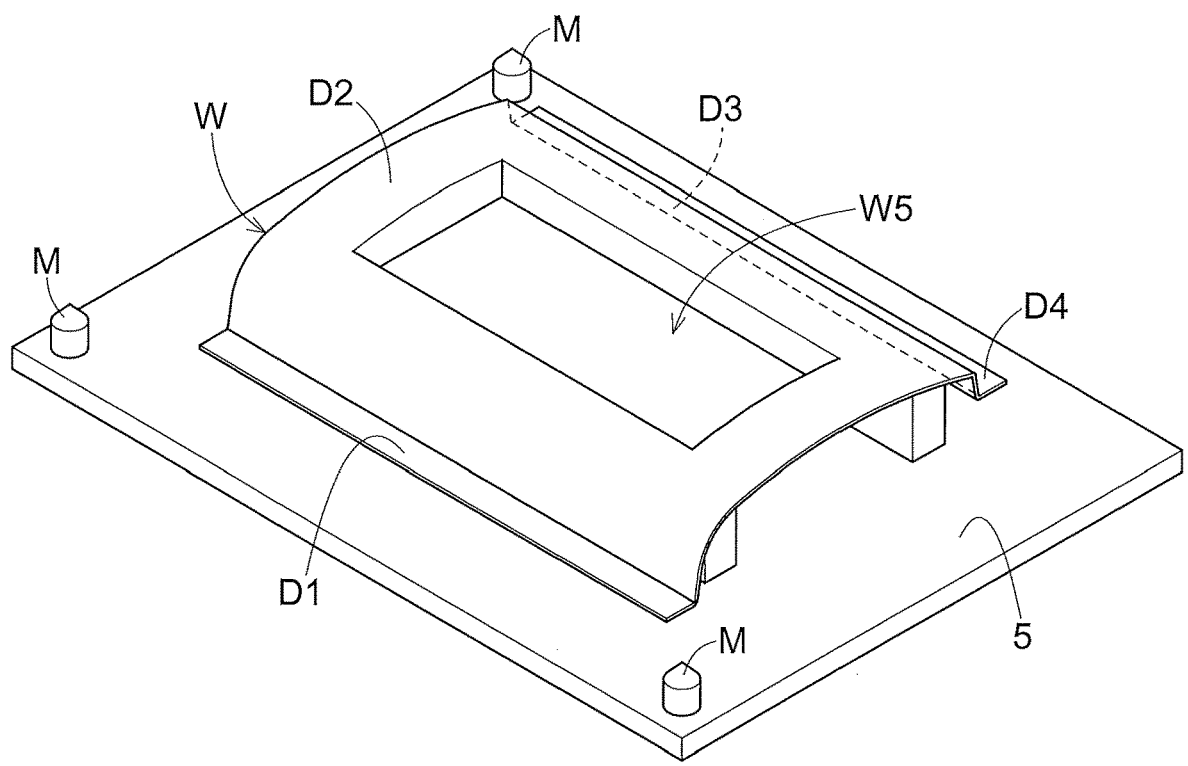
FIG. 23 is an external perspective view of a processing object with an opening.
Figure 24:
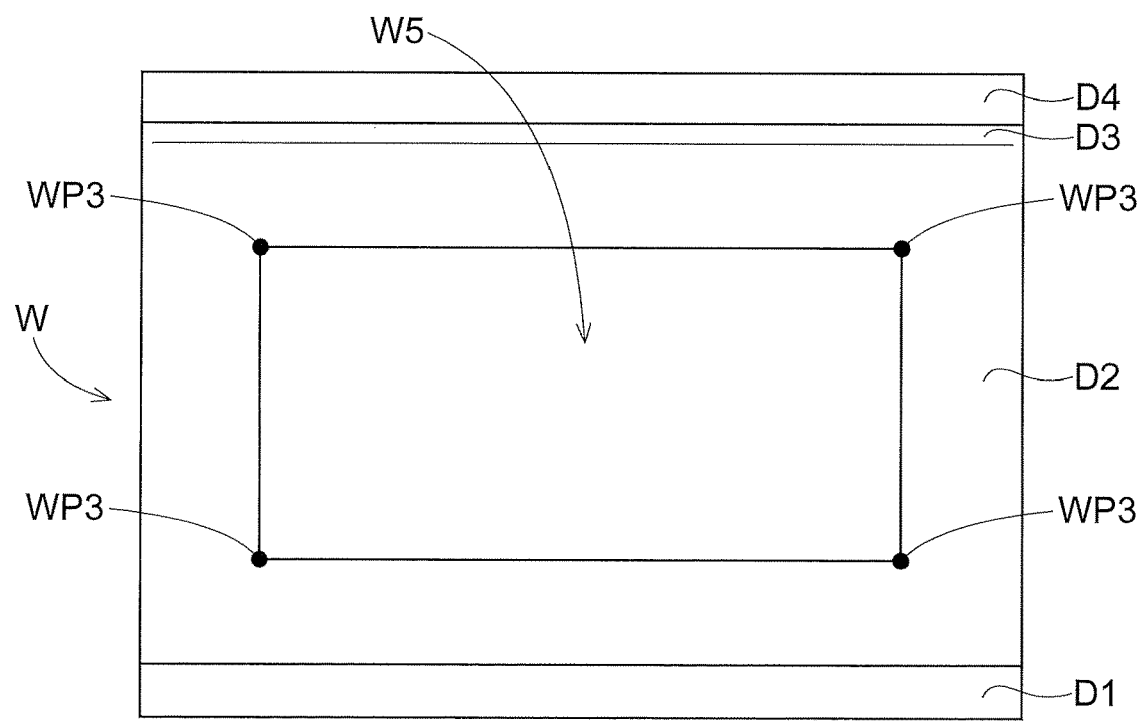
FIG. 24 is a plan view of the processing object with the opening.

Also, in the case where, as shown in FIGS. 23 and 24, for example, an opening W5 serving as a characteristic portion is formed in the reference surface D2 of the aforementioned work W shown in FIG. 13, the PC detects the opening W5 in the reference surface D2, specifies the region thereof, and sets the four corners of the specified region as specific points (opening coordinate specific points WP3).

Next, the PC automatically generates a program of an operation path 6 along which the polishing apparatus 31 of the robot is to be operated, for every reference surface D1 to D4, in accordance with predetermined operation path generation rules.

Here, the aforementioned predetermined operation path generation rules are set based on the characteristic portion of the work W detected by the PC.

For example, in the case where the work W has a plain shape with two flange surfaces at both ends, as shown in FIG. 13, the operation path (not illustrated) is set for the reference surface D1 such that the polishing apparatus implements the polishing processing while moving at a predetermined speed in the longitudinal direction from a polishing start position at an end portion.

Figure 15:
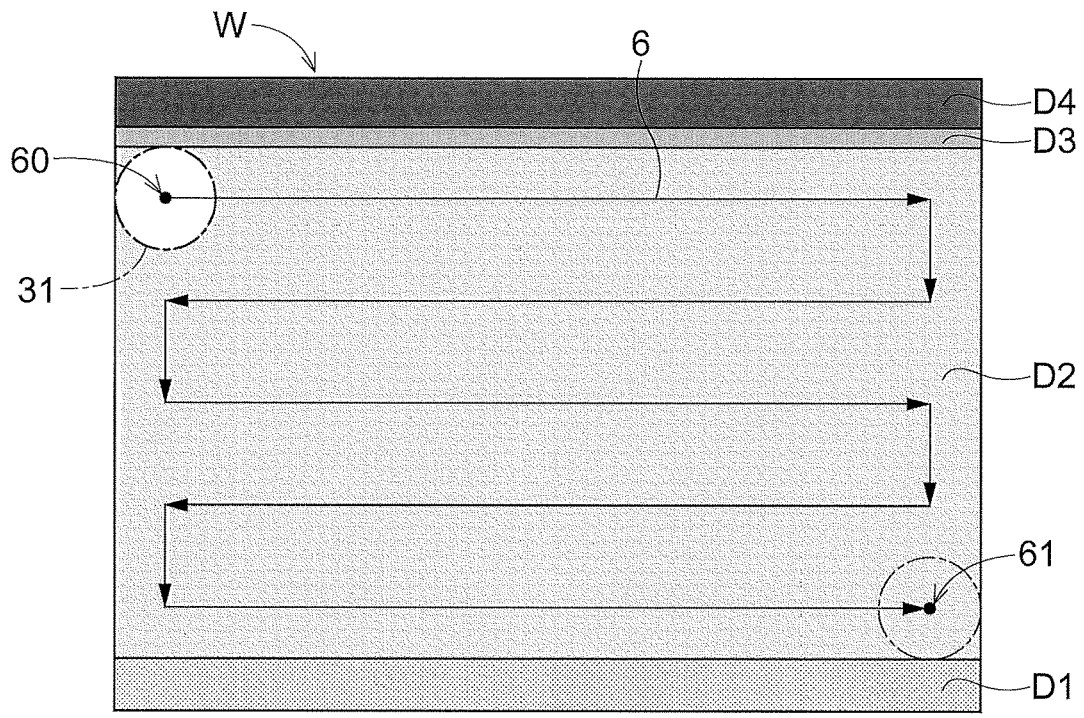
FIG. 15 is a diagram showing an operation path that is generated for the plain processing object.

As shown in FIG. 15, an operation path 6 is set for the reference surface D2 such that the polishing apparatus 31 implements the polishing processing while moving at a predetermined speed in the longitudinal direction from a polishing start position 60 in a corner portion, and implements the polishing processing until a polishing end position 61 while repeatedly doubling back at a predetermined pitch at the end portions and again moving at a predetermined speed in the longitudinal direction. An overrun setting value of the polishing apparatus 31, path pitch (distance between adjacent operation paths), movement speed, parameters relating to the polishing processing and the like are set in advance by an operator.

Note that the overrun setting value refers to the distance to the polishing apparatus from the end portion of the work at the doubling back point of the operation path. The overrun setting value is 0 in the case of FIG. 15, and if set in the plus direction, the polishing apparatus 31 will double back on the outer side of the work W, and, conversely, if set in the minus direction, the polishing apparatus 31 will double back on the inner side of the work W.

Also, in the case where the reference surface is long enough for the polishing apparatus 31 to be able to move in both the longitudinal direction and transverse direction, as with the reference surface D2, a configuration may be adopted in which the operator sets the operation path 6 after selecting one of the longitudinal direction and the transverse direction in advance as the direction in which the polishing apparatus 31 is to start moving from the polishing start position 60.

Figure 27:
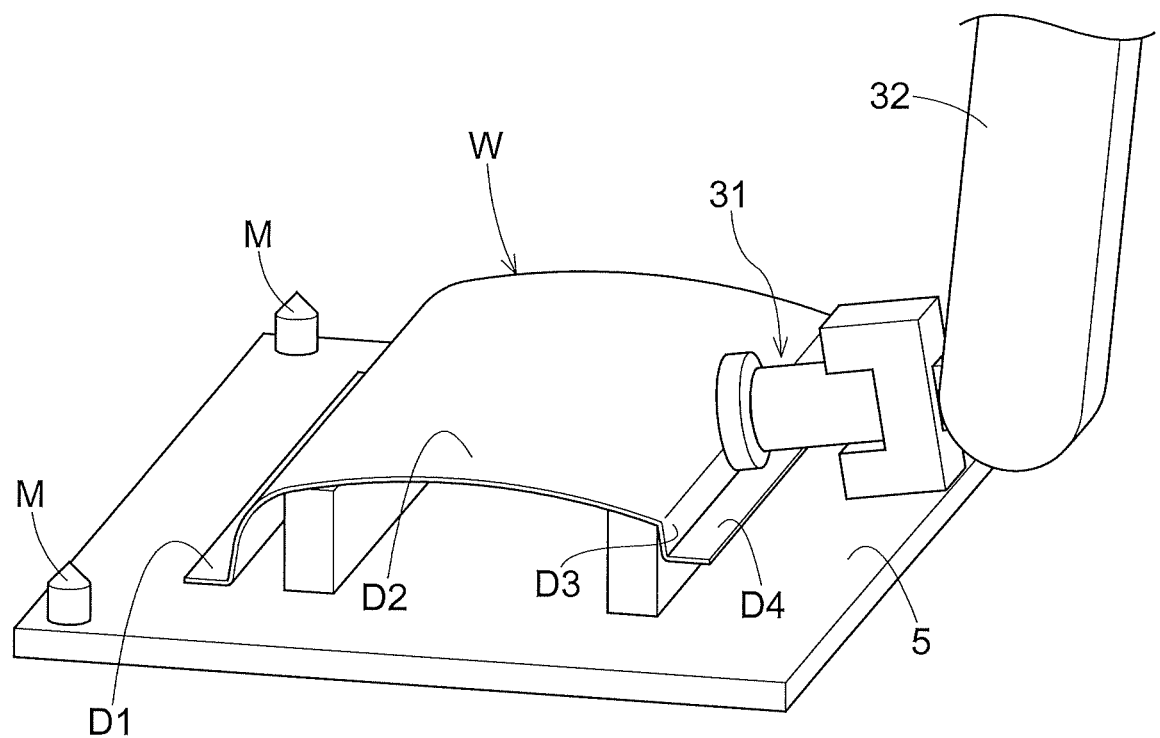
FIG. 27 is a diagram showing polishing work by a polishing robot.
Figure 28:
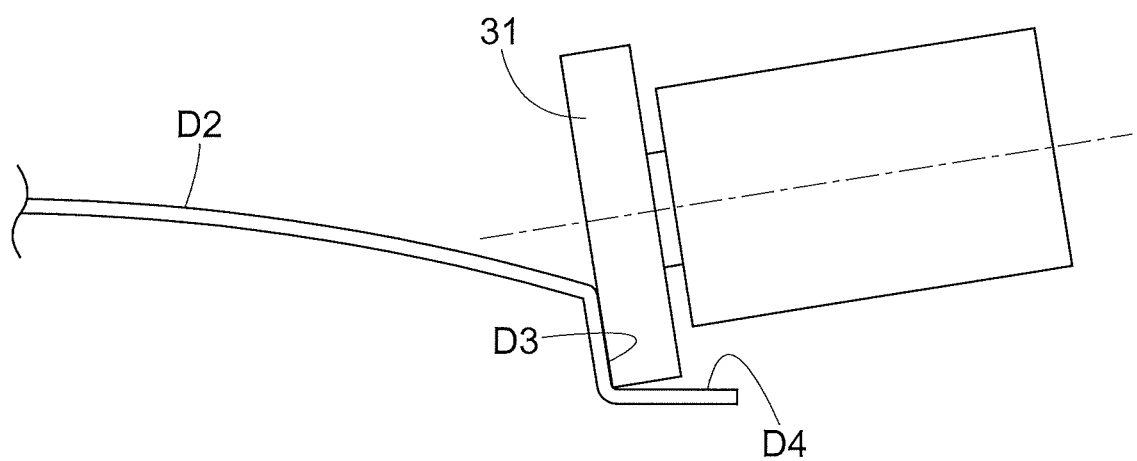
FIG. 28 is a partially enlarged view of FIG. 27.

Although not illustrated, basically operation paths similar to the case of the reference surface D1 are set for the reference surface D3 and the reference surface D4. However, in the case where the length of the reference surface D in the transverse direction is shorter than the size of the polishing apparatus 31 (reference surface D3 in the present embodiment), the operation path may be set so as to shift the center of the polishing apparatus 31 relative to the reference surface D, as shown in FIGS. 27 and 28. Note that a configuration may be adopted in which an operation path is not set, in the case where the area of the reference surface is too small for the polishing apparatus that is used.

Also, in order to prevent excessive polishing, a configuration may be adopted in which the operation path is set such that the polishing time per unit area is adjusted by means such as increasing the movement speed of the polishing apparatus as the contact area between the reference surface and the polishing apparatus becomes smaller.

Figure 18:
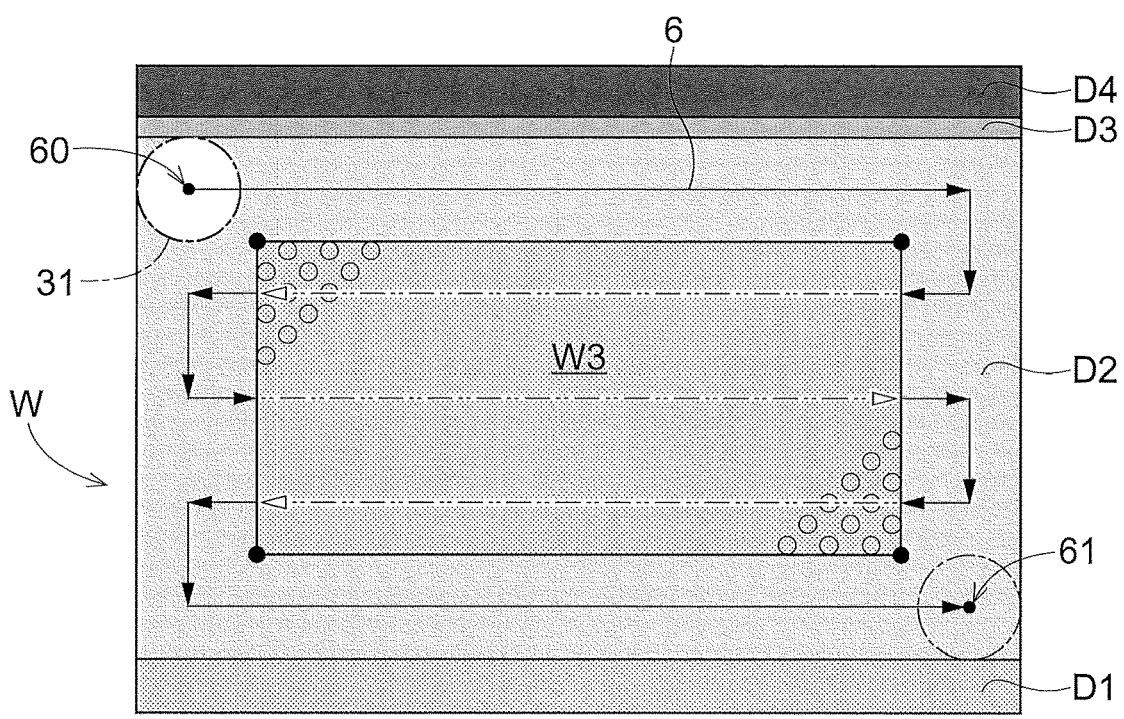
FIG. 18 is a diagram showing an operation path that is generated for the processing object with the multi-hole portion.

Also, in the case where a multi-hole portion W3 is formed in the work W, the basic settings of the operation path 6 are the same as the case of the aforementioned plain work W, although with regard to the multi-hole portion W3 in the reference surface D2, as shown in FIG. 18, in order to prevent excessive polishing, the operation path 6 (see two-dot chain line in FIG. 18) is set such that the polishing time per unit area is adjusted, by means such as increasing the movement speed of the polishing apparatus 31 as the opening ratio becomes larger.

Figure 21:
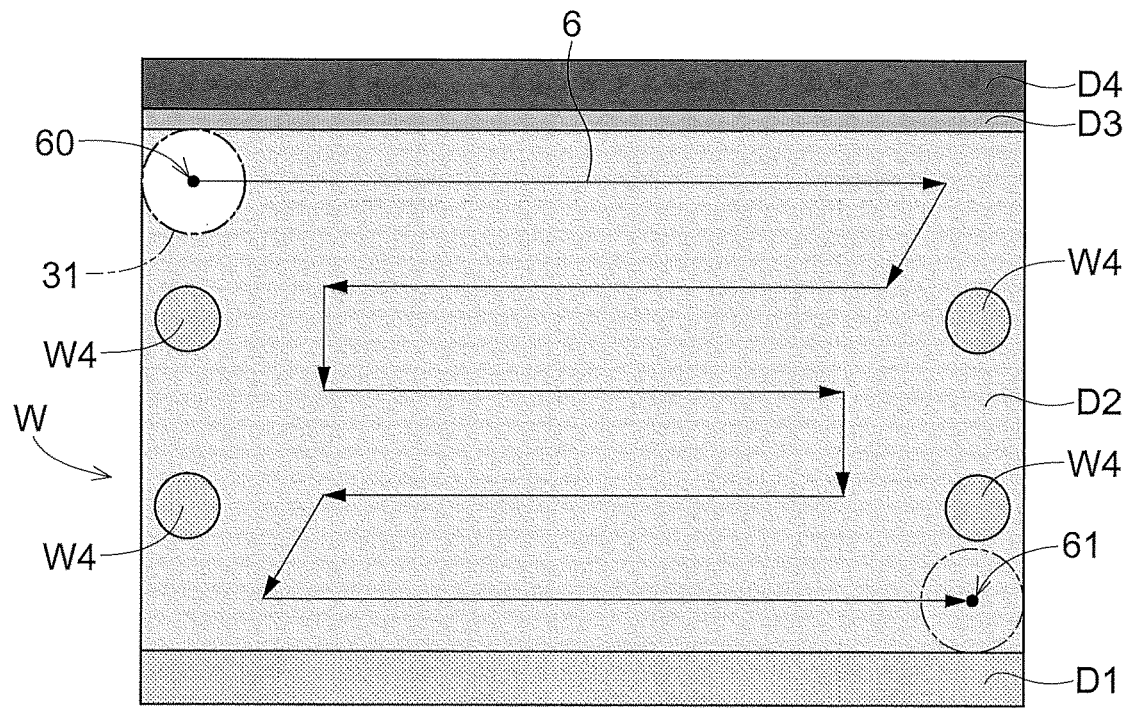
FIG. 21 is a diagram showing an operation path that is generated for the processing object with the raised portions.
Figure 22:
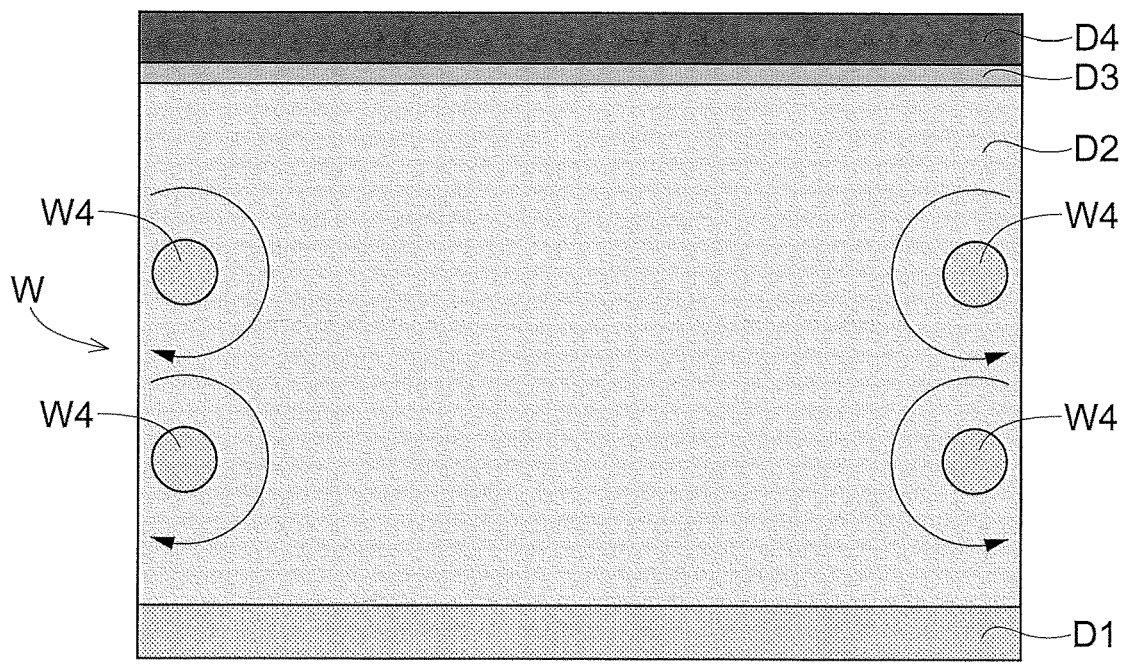
FIG. 22 is a diagram showing an operation path that is generated for the processing object with the raised portions.

Also, in the case where raised portions W4 are formed on the work W, the basic settings of the operation path 6 are the same as the case of the aforementioned plain work W, although with regard to the raised portions W4 on the reference surface D2, the operation path 6 is set such that polishing is performed after excluding the raised portions W4 from the operation path 6, as shown in FIG. 21, and the raised portions W4 are then spot polished, as shown in FIG. 22.

Figure 25:
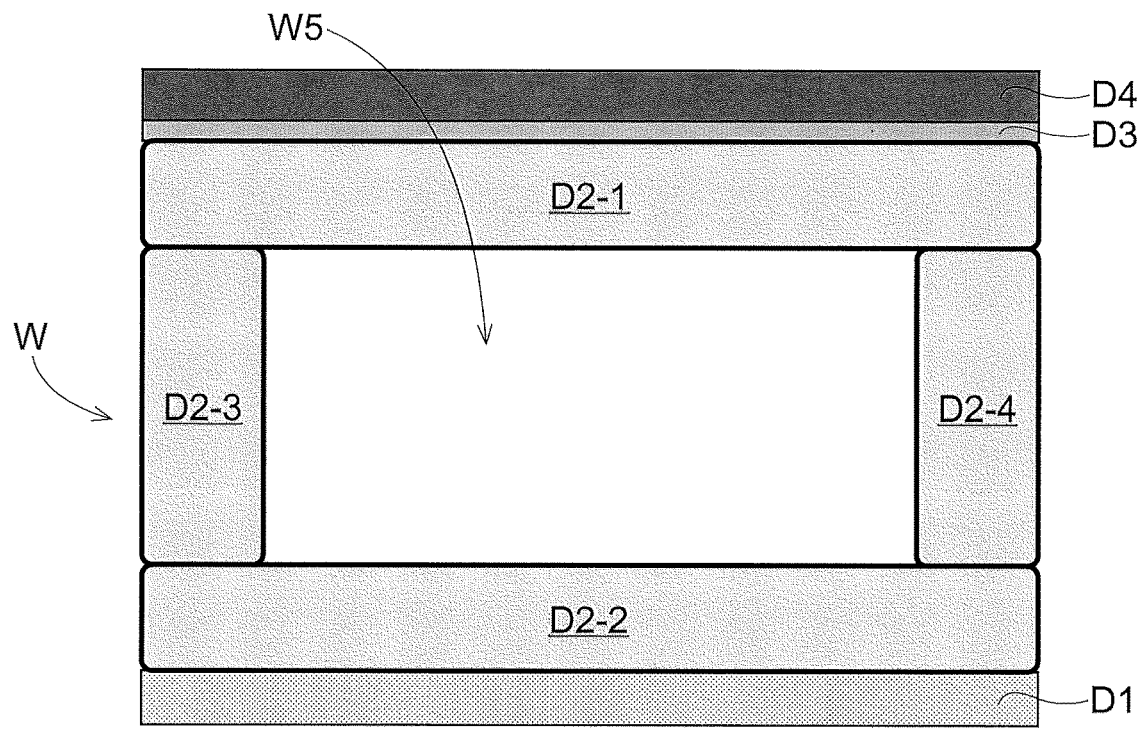
FIG. 25 is a diagram showing reference surfaces that are set for the processing object with the opening.

Also, in the case where an opening W5 is formed in the work W, the basic settings of the operation path 6 are the same as the case of the aforementioned plain work W, although with regard to the opening W5 in the reference surface D2, as shown in FIG. 25, the operation path is set such that the opening W5 is excluded from the operation path, the reference surface D2 is further divided (into reference surfaces D2-1 to D2-4 in the present embodiment), and the resultant reference surfaces are individually polished.

Figure 26:
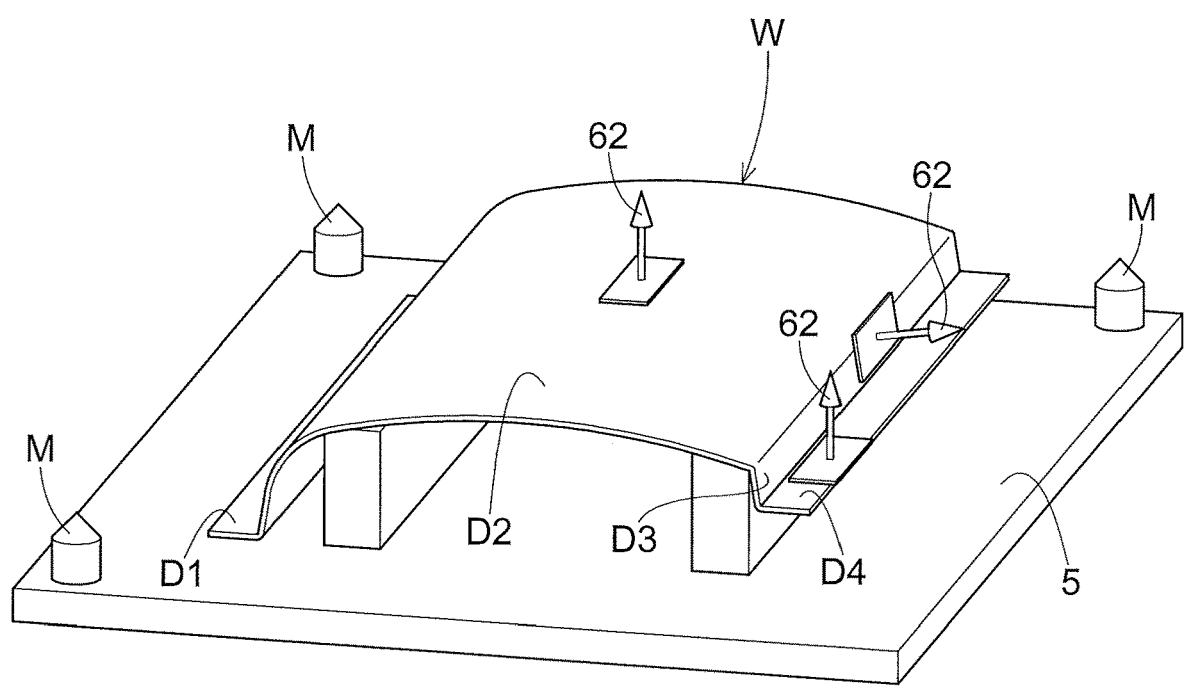
FIG. 26 is a diagram showing how a program relating to normal vectors at arbitrary points on the operation path is automatically generated.

Also, the PC automatically generates a program relating to the angle and position of the polishing apparatus 31 relative to the generated operation path 6. Specifically, as shown in FIG. 26, a normal vector 62 of arbitrary points on the operation path 6 is acquired, and the acquired normal vectors are set as teaching points of the polishing apparatus 31.

The shape of the surface defining the normal vector 62 is desirably constituted as a rectangle or circle having a predetermined area around the teaching point, according to the shape of the reference surface. When the acquired normal data is directly used as teaching points of the polishing apparatus 31, small changes in the reference surface will be directly reflected, thus resulting in the polishing apparatus of the polishing robot that has been taught moving with a swaying motion. To prevent this, the movement of the polishing apparatus 31 can be stabilized, by utilizing points obtained by averaging the normals of a polygon within a rectangular range of a predetermined area around a teaching point as teaching points. Also, in the case of a work W having a uniform curvature radius in all directions, the shape of the surface defining the normal vector is desirably circular rather than rectangular.

Figure 29:
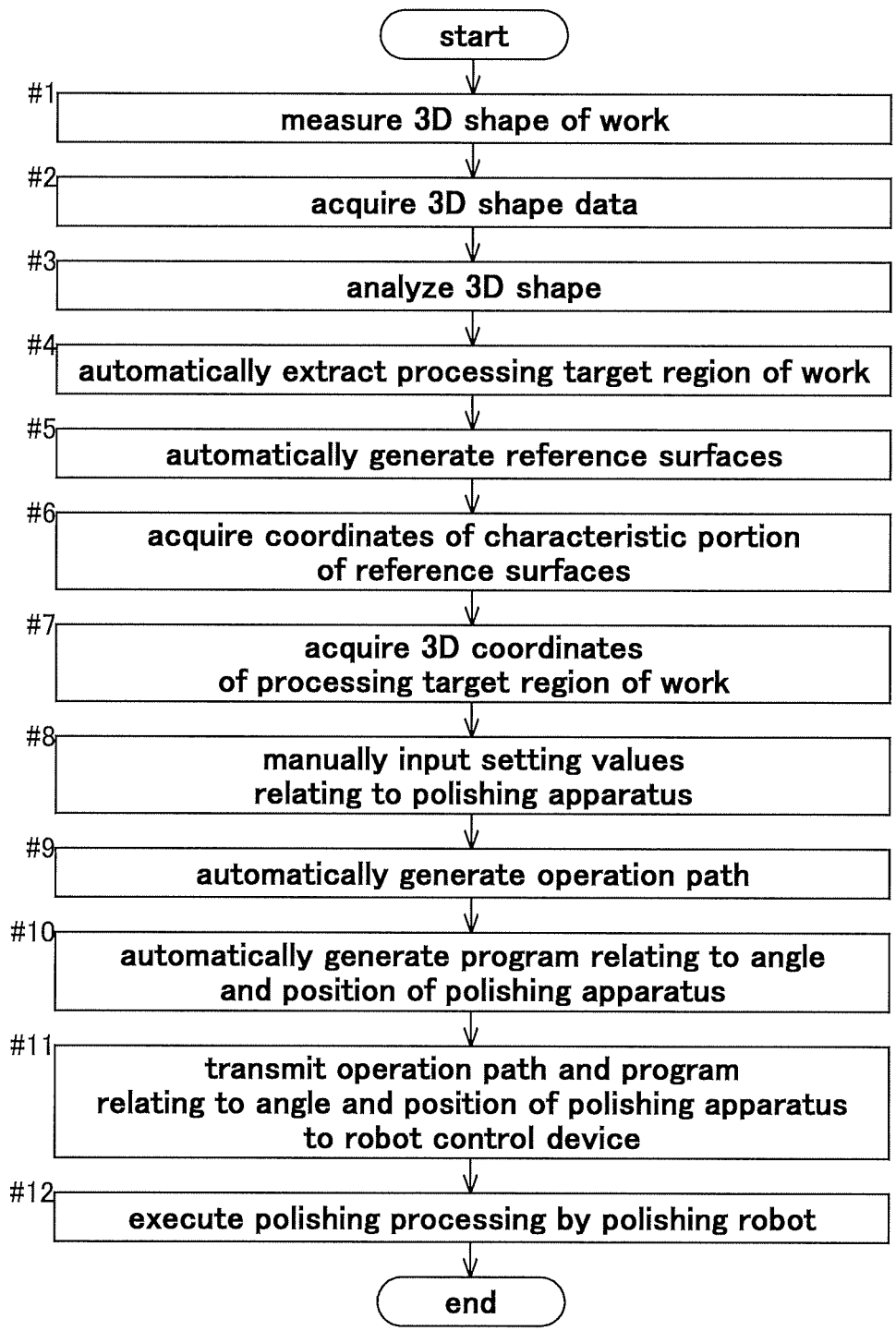
FIG. 29 is a diagram showing the processing flow of polishing work.

Polishing Processing Method:

An example of a method for implementing polishing processing of the work W by applying the automatic teaching system of the present invention to the polishing robot 30 will be described in line with FIG. 29.

First, the three-dimensional shape of the work W is measured in the scanning area 2 (#1). A pallet member 5 having reference markers M is placed on the belt conveyor 4, and a work W serving as the processing target is further loaded on the pallet member 5.

Scanning by the 3D laser scanners 21 is implemented, and three-dimensional point group data of the work W including the pallet member 5 is acquired (#2). At this time, the position of the work W relative to the reference markers M is grasped, by scanning the work W and the reference markers M at the one time.

Next, three-dimensional shape analysis is performed by the PC on the three-dimensional point group data acquired by the 3D laser scanners 21 (#3). Specifically, substitution of three-dimensional point group data is performed such that the scan line intervals in the X-axis direction are regular intervals.

The PC automatically extracts a processing target region on the work W from the acquired three-dimensional point group data of the work W including the pallet member 5 (#4).

The PC automatically generates reference surfaces D by dividing the extracted processing target region into a plurality of continuous reference surfaces D, in accordance with a predetermined algorithm (#5).

The PC acquires the coordinates of a characteristic portion such as a recessed portion, raised portion or opening for each of the generated reference surfaces D (#6). Three-dimensional coordinates of the processing target region of the work W are then created (#7).

Next, the operator manually inputs setting values relating to the polishing apparatus 31 to the PC, such as the overrun setting value of the polishing apparatus 31, path pitch, movement speed, and parameters relating to polishing processing (#8). Note that, with regard to the operation of #8, the operator may configure the settings in advance, rather than in accordance with the flow of FIG. 29.

Next, the PC automatically generates a program of the operation path 6 along which the polishing apparatus 31 of the robot is to be operated, for every reference surface D, in accordance with predetermined operation path generation rules (#9).

Further, the PC automatically generates a program relating to the angle and position of the polishing apparatus 31 relative to the generated operation path 6 (#10).

The program of the operation path 6 and the program relating to the angle and position of the polishing apparatus 31 are transmitted to the robot control device of the polishing area 3 from the PC, and teaching of the polishing robot 30 ends (#11).

After the pallet member 5 on which the work W is loaded is automatically conveyed from the scanning area 2 to the polishing area 3 by the belt conveyor 4, polishing processing by the polishing robot 30 is executed on the processing target region of the work W (#12).

As described above, by implementing the automatic teaching system of the present invention according to the present invention, operation contents that would conventionally take a specialist technician approximately 8 hours to teach to a polishing robot can be performed in approximately 1 minute, greatly reducing the robot teaching time. Generally, polishing processing needs to be executed on a plurality of works, and thus in the case of processing five works, for example, starting the polishing processing would conventionally take up to one week (8 hours×5 works=40 hours), whereas this can be completed in one day, by implementing the automatic teaching system of the present invention according to the present invention.

Other Embodiments

1. In the abovementioned embodiment, a 3D laser scanner employing a slider method is used, but the present invention is not limited to this configuration, and a configuration may be adopted in which scanning is implemented using a robot hand apparatus that is provided with a 3D laser scanner. According to this configuration, scanning is possible in the movable range of the robot hand apparatus, including the end surface of the processing object perpendicular to the slider and the back surface of the processing object which are difficult or impossible to scan with a slider-type scanner.

2. In the abovementioned embodiment, a configuration for polishing parts constituting a portion of an automobile body or the like as works was described, but the present invention is not limited thereto, and the automatic teaching system according to the present invention may also be applied in cases such as polishing or coating the entire body of an automobile, railway vehicle or the like as a work, as shown in FIG. 30, for example.

In FIG. 30, in the case of polishing or coating the entire body of a railway vehicle 7, for example, a portal scanner apparatus 8 can be used as a scanning apparatus, and a work robot (not illustrated) equipped with a polishing apparatus or coating apparatus can be used as a work apparatus. In the portal scanner apparatus 8, a plurality of 3D scanners 80 are respectively provided in upper and side portions, enabling the upper and side surfaces of the railway vehicle 7 to be measured.

A traveling rail 9 extending the entire length of the railway vehicle 7 is installed near the railway vehicle 7, and the portal scanner apparatus 8 and the work robot are configured to be able to move on the traveling rail 9. The operation process is divided into a plurality of blocks, taking the movable range of the work robot as one block, and three reference markers M are provided per block. Scanning, post-scan image analysis and polishing work are then implemented on each block, similarly to the case of the above-mentioned polishing processing method.

Note that, as shown in FIG. 30, in the present embodiment, robot hand apparatuses 23 provided with the 3D laser scanner 21 may be used, in addition to the portal scanner apparatus 8, as needed. The robot hand apparatus 23 is configured to be able to travel on the traveling rail 9, and scan portions which are difficult or impossible to scan with the portal scanner apparatus 8. Also, the robot hand apparatus 23 may be constituted such that the 3D laser scanner 21 can be interchanged with a predetermined polishing apparatus or coating apparatus by a tool changer, for example.

3. In the abovementioned embodiment for polishing or coating the entire body of an automobile, railway vehicle or the like as a work, the portal scanner apparatus 8 was used, but the present invention is not limited to this configuration, and a configuration may alternatively be adopted in which a multi-axis robot is used, for example. In this case, a multi-axis self-propelled robot provided with a three-dimensional shape measurement apparatus on the tip of the arm and a multi-axis self-propelled robot provided with a polishing apparatus on the tip of the arm are used, three reference markers are provided within the movable range of these robots, and scanning, post-scan image analysis and polishing work are implemented similarly to the case of the above-mentioned polishing processing method.

4. In the abovementioned embodiment, an example in which the automatic teaching system according to the present invention is applied to a polishing robot that polishes works was described, but the present invention is not limited thereto, and the automatic teaching system according to the present invention may, for example, be alternatively applied to a coating robot that coats works.

5. In the abovementioned embodiment, a configuration may be adopted in which a large processing object and reference markers are scanned at the one time, using a stationary three-dimensional shape measurement apparatus.

Note that although the present invention has been described above with reference to the drawings, the present invention is, needless to say, not limited to the configuration in the drawings, and can be carried out in various modes without departing from the scope of the invention.

INDUSTRIAL APPLICABILITY

The automatic teaching system of the present invention can be particularly favorably utilized in technical fields in which polishing or coating is performed on, for example, the entire body in an automobile, railway vehicle, airplane, marine vessel or the like, or on various constituent parts thereof.

DESCRIPTION OF REFERENCE SIGNS

1 Automatic polishing system
2 Scanning area
20 Main body frame
21 3D laser scanner (example of three-dimensional shape measurement apparatus)
22 Single-axis slider
23 Robot hand apparatus
24 Support member
3 Polishing area
30 Polishing robot
31 Polishing apparatus
32 Robot arm
4 Belt conveyor
5 Pallet member
50 Through hole
6 Operation path
60 Polishing start position
61 Polishing end position
62 Normal vector
7 Railway vehicle
8 Portal scanner apparatus
80 3D scanner
9 Traveling rail
W Work
W1 Half-tube raised portion (semicircular portion)
W2 Straight portion
W3 Multi-hole portion (example of recessed portion)
W4 Raised portion
W5 Opening
WP1 Multi-hole portion coordinate specific point
WP2 Raised portion coordinate specific point
WP3 Opening coordinate specific point
D Reference surface
R Curvature radius
M Reference marker
B Base member

The invention claimed is:

1. An automatic teaching system for teaching operation contents to a robot having a polishing apparatus that polishes a processing object or a coating apparatus that coats a processing object, the system comprising:
a reference marker;
a three-dimensional shape data measurement apparatus configured to acquire shape data of a processing target region on the processing object relative to the reference marker;
an image analysis apparatus; and
a robot control device configured to control the robot, wherein the image analysis apparatus divides the shape data of the processing target region into a plurality of continuous reference surfaces, the image analysis apparatus generates a program of an operation path along which the polishing apparatus or the coating apparatus of the robot is to be operated, for every reference surface, and where the length of the reference surface in a transverse direction is shorter than the size of a diameter of the polishing apparatus or the size of a diameter of the coating apparatus, transmits the program of the operation path to the robot control device to shift a center of the polishing apparatus or the coating apparatus from a center of the reference surface in the transverse direction.

2. The automatic teaching system according to claim 1, wherein the image analysis apparatus further automatically generates a program relating to an angle and position of the polishing apparatus or coating apparatus relative to the generated operation path, and transmits the program relating to the angle and position of the polishing apparatus or coating apparatus to the robot control device.

3. The automatic teaching system according to claim 2, wherein the image analysis apparatus divides the shape data of the processing target region into a plurality of continuous reference surfaces, in accordance with a predetermined algorithm, and
the predetermined algorithm is an algorithm that divides the shape data of the processing target region of the processing object into a plurality of continuous reference surfaces, based on a curvature radius of the processing target region.

4. The automatic teaching system according to claim 2, wherein the image analysis apparatus generates a program of the operation path, in accordance with a predetermined operation path generation rule, and
the predetermined operation path generation rule is a rule set based on a characteristic portion of the processing target region detected from the shape data by the image analysis apparatus.

5. The automatic teaching system according to claim 2, comprising:
a pallet member for loading the processing object, wherein the reference marker is provided to the pallet member, and the shape data of the processing target region on the processing object relative to the reference marker is acquired for the pallet member on which the processing object is loaded.

6. The automatic teaching system according to claim 1, wherein the image analysis apparatus divides the shape data of the processing target region into a plurality of continuous reference surfaces, in accordance with a predetermined algorithm, and
the predetermined algorithm is an algorithm that divides the shape data of the processing target region of the processing object into a plurality of continuous reference surfaces, based on a curvature radius of the processing target region.

7. The automatic teaching system according to claim 6, wherein the image analysis apparatus generates a program of the operation path, in accordance with a predetermined operation path generation rule, and
the predetermined operation path generation rule is a rule set based on a characteristic portion of the processing target region detected from the shape data by the image analysis apparatus.

8. The automatic teaching system according to claim 6, comprising:
a pallet member for loading the processing object, wherein the reference marker is provided to the pallet member, and the shape data of the processing target region on the processing object relative to the reference marker is acquired for the pallet member on which the processing object is loaded.

9. The automatic teaching system according to claim 1, wherein the image analysis apparatus generates a program of the operation path, in accordance with a predetermined operation path generation rule, and the predetermined operation path generation rule is a rule set based on a characteristic portion of the processing target region detected from the shape data by the image analysis apparatus.

10. The automatic teaching system according to claim 9, wherein the characteristic portion of the processing target region is a recessed portion, raised portion or opening with respect to the reference surface.

11. The automatic teaching system according to claim 9, comprising:

a pallet member for loading the processing object, wherein the reference marker is provided to the pallet member, and the shape data of the processing target region on the processing object relative to the reference marker is acquired for the pallet member on which the processing object is loaded.

12. The automatic teaching system according to claim 1, further comprising:

a pallet member for loading the processing object, wherein the reference marker is provided to the pallet member, and the shape data of the processing target region on the processing object relative to the reference marker is acquired for the pallet member on which the processing object is loaded.

* * * * *

UNITED STATES PATENT AND TRADEMARK OFFICE
CERTIFICATE OF CORRECTION

| | |
|---|---|
| PATENT NO. | : 12,050,457 B2 |
| APPLICATION NO. | : 17/268254 |
| DATED | : July 30, 2024 |
| INVENTOR(S) | : Genji Nakayama et al. |

It is certified that error appears in the above-identified patent and that said Letters Patent is hereby corrected as shown below:

In the Claims

Column 12, Line 1, Claim 1, before "is" delete "of the robot"

Signed and Sealed this
First Day of October, 2024

Katherine Kelly Vidal
*Director of the United States Patent and Trademark Office*